United States Patent
Sakamoto et al.

(10) Patent No.: US 6,480,192 B1
(45) Date of Patent: Nov. 12, 2002

(54) RECORDING MEDIUM, APPARATUS AND METHOD FOR PROCESSING IMAGES

(75) Inventors: Hideki Sakamoto, Fukuoka; Isamu Terasaka, Tokyo, both of (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/427,580

(22) Filed: Oct. 27, 1999

(30) Foreign Application Priority Data

Oct. 27, 1998 (JP) ............................................ 10-305955

(51) Int. Cl.$^7$ .............................................. G06T 15/00
(52) U.S. Cl. ....................................... 345/419; 345/473
(58) Field of Search ................................ 345/419, 473, 345/592

(56) References Cited

U.S. PATENT DOCUMENTS 5,995,111 A * 11/1999 Morioka et al. ............ 345/592

FOREIGN PATENT DOCUMENTS

| JP | 7-328228 | 12/1995 |
| JP | 10-074258 | 3/1998 |

OTHER PUBLICATIONS

Note: Partial Translation in the form of an English abstract is attached.
Note: Office Action from Singapore Registry of Patents, with enclosed Written Opinion from Australian Patent Office, is attached.

* cited by examiner

*Primary Examiner*—Mark Zimmerman
*Assistant Examiner*—Lance W. Sealey
(74) *Attorney, Agent, or Firm*—Paul A. Guss

(57) ABSTRACT

On a screen display, a specialized image effect is easily attained in which near images are made to appear clearly while distant images are seen as blurred. An image is formed on a screen in which for an image pertaining to a background containing far-distance object group for which the depth amount thereof is comparatively large, the source image is made as a semi-transparent processed image for which a two pixel portion thereof is shifted in an upward direction, for an image pertaining to a mid-distance object group the source image is made as a semi-transparent formation processed image for which a one pixel portion thereof is shifted in an upward direction, and for an image pertaining to a near-distance object an upward shifting processing is not performed. For an image after such processing is performed, a near image appears distinctly, a middle-degree distant image appears somewhat blurred and a far-distant image appears still more blurred.

39 Claims, 16 Drawing Sheets

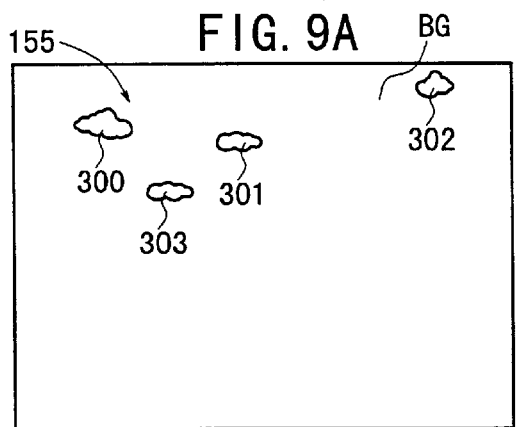
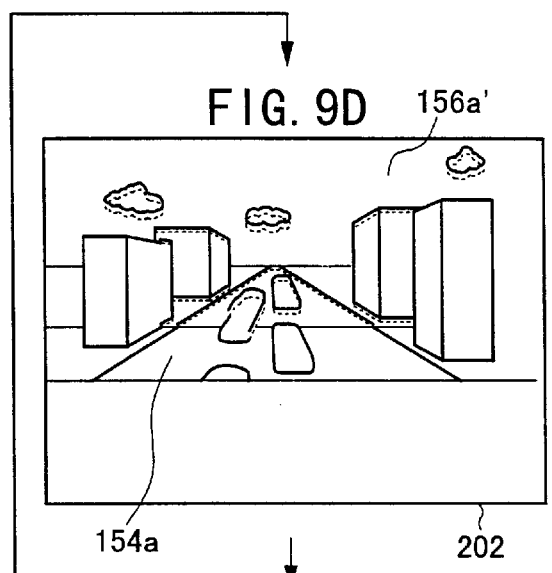
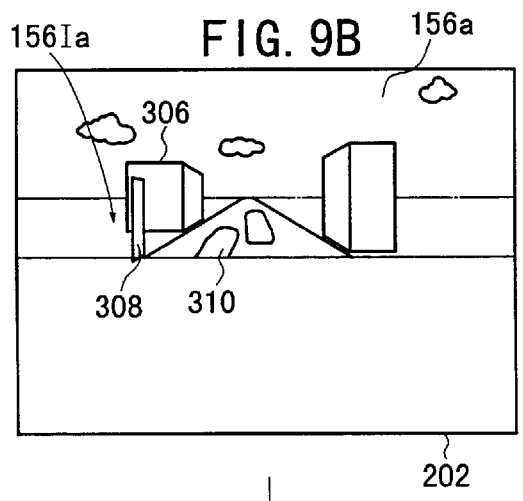
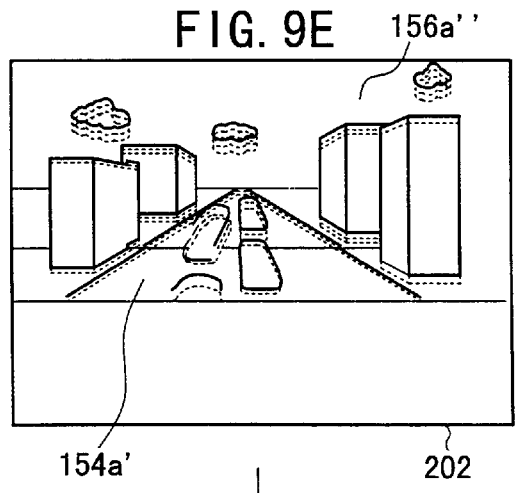
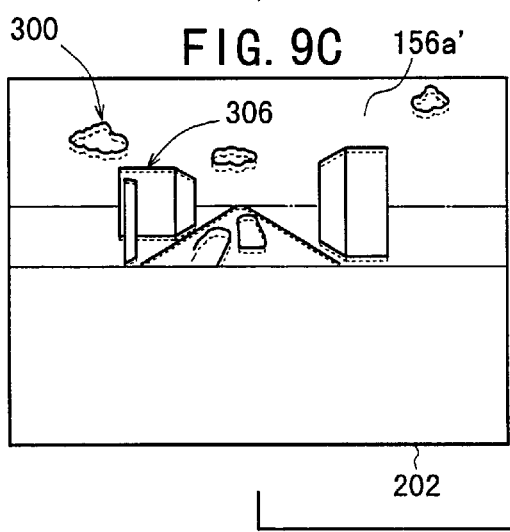
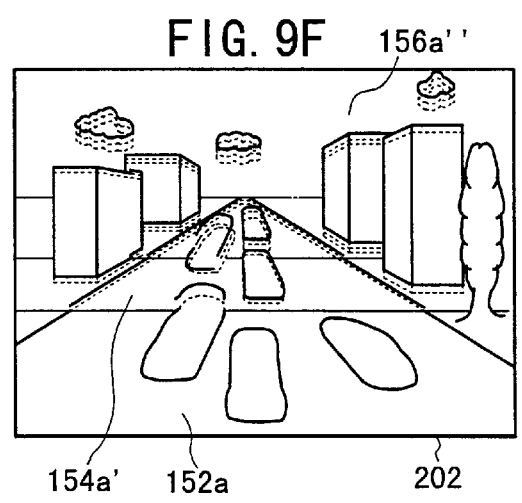

FIG. 11

| | | | 202 | |
|---|---|---|---|---|
| a00 | a01 | a02 | ---------- | a0255 |
| a10 | a11 | - | ---------- | a1255 |
| a20 | - | - | ---------- | a2255 |
| │ | │ | │ | │ | │ |
| a2390 | a2391 | - | ---------- | a239255 |

FIG. 14

$\swarrow \beta$

| $\dfrac{\alpha 11+B}{2}$ | $\dfrac{\alpha 12+B}{2}$ | $\dfrac{\alpha 13+B}{2}$ | $\dfrac{\alpha 14+B}{2}$ | $\dfrac{\alpha 15+B}{2}$ |
|---|---|---|---|---|
| $\dfrac{\alpha 21+\alpha 11}{2}$ | $\dfrac{\alpha 22+\alpha 12}{2}$ | $\dfrac{\alpha 23+\alpha 13}{2}$ | $\dfrac{\alpha 24+\alpha 14}{2}$ | $\dfrac{\alpha 25+\alpha 15}{2}$ |
| $\dfrac{\alpha 31+\alpha 21}{2}$ | $\dfrac{\alpha 32+\alpha 22}{2}$ | $\dfrac{\alpha 33+\alpha 23}{2}$ | $\dfrac{\alpha 34+\alpha 24}{2}$ | $\dfrac{\alpha 35+\alpha 25}{2}$ |
| $\dfrac{\alpha 41+\alpha 31}{2}$ | $\dfrac{\alpha 42+\alpha 32}{2}$ | $\dfrac{\alpha 43+\alpha 33}{2}$ | $\dfrac{\alpha 44+\alpha 34}{2}$ | $\dfrac{\alpha 45+\alpha 35}{2}$ |
| $\alpha 41$ | $\alpha 42$ | $\alpha 43$ | $\alpha 44$ | $\alpha 45$ |

RECORDING MEDIUM, APPARATUS AND METHOD FOR PROCESSING IMAGES

BACKGROUND OF THE INVENTION

1. Field of the Invention

The present invention concerns a recording medium, an image processing apparatus and method for image processing which concerns an effective image display, or image processing, of a three-dimensional image which is displayed on a screen of a CRT display device or the like.

2. Description of the Related Art

With respect to images, there is a "blurring" technique which is used to give a fixed effect of three-dimensionality or sense of perspective. For example, when a picture is taken with a camera, portions which are in sharp focus are photographed distinctly, and accompanying a distancing away from the focus point, the degree of blurring increases. It is known that such blurring imparts a sense of perspective to the photograph.

As a blurring process which is performed by computer processing, there is a technique disclosed, for example, by Japanese Laid-Open Patent Publication 10-74258.

This technique is one for which, with respect to data having distance information, image data having a blurring amount which depends on the distance information is generated by processing the data through a digital low-pass filter having a frequency cutoff corresponding to the distance information.

Notwithstanding, with this technique, because it is required to process image data based on low pass filtering, such as with use of a digital Butterworth filter, the computational burden for attaining the blurred images is extremely large, and accordingly, there is a problem that processing time is required.

SUMMARY OF THE INVENTION

The present invention, while taking into consideration this type of problem, has an object of providing a recording medium, image processing apparatus and method for image processing, which is capable of imparting to a three-dimensional display image (containing a three-dimensional image therein) a highly superior specialized effect heretofore unavailable.

Further, the present invention has the object of providing an image processing apparatus and method for image processing capable of easily generating a blurred image.

Furthermore, the present invention has the object of providing an image processing apparatus and method for image processing capable of easily generating a screen image (image) to which a specialized effect is imparted such that, while items existing in the foreground are not blurred, items which are distanced as compared to items in the foreground appear further blurred.

On the recording medium according to the present invention, a program is stored comprising a step of shifting, based on depth amount information of a plurality of three-dimensional objects, at least one pixel portion of an image on a display which corresponds to an object having large depth amount, from among the plurality of three-dimensional objects, and a step of generating a screen image for displaying, on a screen, an image In which the image shifted by one pixel portion thereof is overlaid on the image existing before such one pixel portion shifting takes place, together with an image corresponding to an object having a small depth amount.

According to the present invention, from among a plurality of three-dimensional images, a large depth amount image can be made as an image having a blurred focus. As a result, when seen from the point of An observer (camera), images which are more distant can be seen as blurred images, and images having a small depth amount (images which are in front of the blurred images), can be seen as images which are in focus (distinct images). Further, the pixel number shifted on the display can be selected as an optimal pixel number depending on, for example, the display type or the tastes and so forth of the observer.

In this case, by rendering an image corresponding to a three-dimensional object having a large depth amount on a two-dimensional background image which is rendered to have the largest depth amount, the image display is made more natural.

Further, although the direction of the at least one pixel shift on the display can be in any optional direction, by making this direction to be either an upward direction or a downward direction on the screen, for example, the invention can optimally be applied to an entertainment system (for example, an apparatus having a sound reproduction function using a compact disk CD or an image and sound reproduction function using a video CD, and further having a gaming function) or the like, which uses a horizontal scanning type of display.

Herein, by subjecting the blurred image to a semi-transparency formation processing, the blurred image can be made as a more harmonious image.

Moreover, by making a three-dimensional object to be a fixed and/or moving object, as seen from a viewpoint created by the image which corresponds to the object, for example when the viewpoint is fixed, a moving object which moves from a rearward toward a forward direction of the screen can be changed from a blurred image to a distinct image corresponding to the depth amount thereof. Oppositely, an image which moves from a frontal toward a rearward direction of the screen can be changed from a distinct image (an image in focus) to a blurred image corresponding to the depth amount thereof.

Further, an image processing apparatus according to the present invention comprises a recording means in which a plurality of three-dimensional objects together with depth amount information are stored, a frame buffer having a rendering area in which the plurality of three-dimensional objects are converted into images by a fixed process and rendered, display means for displaying on a screen images rendered in the rendering area of the frame buffer, and rendering control means for performing conversion processing for converting from the three-dimensional objects to the images, wherein the rendering control means shifts, by at least one pixel portion and renders in the frame buffer an image corresponding to an object having a large depth amount, from among the plurality of three-dimensional objects, based on the depth information of the plurality of three-dimensional objects, generates and draws an image (blurred image) for which the image shifted by one pixel portion and rendered is subjected to semi-transparency formation processing and overlaid on the image existing before the one pixel shifting took place, renders in the rendering area the blurred image together with an image having a small depth amount from an image corresponding to the plurality of three-dimensional objects, and displays on the display means the blurred image together with the image having a small depth amount.

The present invention can advantageously be applied to an entertainment system, for example, comprising the recording means, frame buffer, display means and rendering control means.

In this case as well, overlaying onto a two-dimensional image of a farthest distant scene is possible.

Further, a control is provided by which the rendering areas are set as two areas in the frame buffer, and wherein the rendering control means, at a time when an image rendered in one rendering area is being displayed on the screen of the display means, performs rending of an image containing the blurred image in the other rendering area, and after rending of the image containing the blurred image has been completed, the image rendered in the other rendering area is displayed on the screen of the display means, wherein as a result of such control, the present invention can be applied to a frame buffer having a plurality of rendering areas.

In this case as well, the direction of shifting by at least one pixel portion on the screen can be taken as any optional direction, however, in the case of a horizontal scan type of display, an upward or downward direction on the screen is favorable.

Naturally, the three-dimensional object can be a fixed object and/or a moving object, as seen from a viewpoint created by the image corresponding to the object.

Further, the method for image processing according to the present invention comprises a step of preparing source image data in which each pixel value is represented as an RGB value, a step of creating one-pixel shifted image data for which the source image data is shifted by at least one pixel in a predetermined direction, and a step of creating blurred image data formed by overlaying the one-pixel shifted data on the source image data and from RGB values respectively added at a fixed ratio to the RGB values of pixels corresponding in position.

According to this aspect of the invention, blurred image data can be easily created.

In this case, the fixed direction is taken as any of up, down, right or left directions, and by making the fixed ratio to be roughly 50%:50%, an image in which the focus is shifted with respect to the source image can be easily created.

Further, an image processing apparatus according to the present direction comprises: a recording means in which a plurality of three-dimensional objects are recorded together with depth information; a frame buffer having a rendering area in which the plurality of three-dimensional objects are rendered after being subjected to a perspective projection conversion at a fixed viewpoint and converted into images; display means for displaying on a screen a plurality of images which are rendered in the rendering area; and rendering control means for performing the perspective projection conversion processing, wherein the rendering control means, in the rendering area of the frame buffer, classifies images corresponding to the plurality of three-dimensional objects, based on the fixed viewpoint, into a far-distance image group pertaining to the depth information, a mid-distance image group, and a near-distance image group, renders the far-distance image group in the rendering area, renders images (blurred far-distance image group) in the rendering area formed by subjecting to semi-transparency formation processing and overlaying the far-distance image group which has been shifted by at least one pixel portion in a first fixed direction on the far-distance image group existing prior to such shifting, further renders the mid-distance image group in the rendering area, and further, renders in the rendering area images (images formed by a double-blurred far-distance image group and a blurred mid-distance image group) formed by subjecting to semi-transparency formation processing and overlaying the mid-distance image group and the far-distance image group which have been shifted by at least one pixel position in a second fixed direction with respect to the rending area in which the mid-distance image group and far-distance image group are rendered, on the image group existing prior to such shifting, and further renders the near-distance image group in the rendering area.

According to this aspect of the present invention, it becomes possible to simultaneously display on a display device a near-distance image group for which blurring processing is not conducted, a blurred mid-distance image group which is shifted by at least one pixel behind the near-distance image group, and further, a blurred far-distance image group which is shifted by at least two pixels behind the mid-distance image group. By doing so, on the screen of the display device, for example, a distinct near-distance image group, a slightly blurred mid-distance image group, and a further blurred far-distance image group can be observed, and it is possible to observe an image (screen image) which is equivalent to a case in which a camera focus is adjusted on a near-distance image group.

In this case as well, behind the far-distance object group a two-dimensional background image group can be displayed.

Further, the first and second fixed directions can be the same direction or in different directions, wherein as a result, the direction of the blurring can be set at an optional direction.

Furthermore, in the case of a horizontal scan type display device, it is favorable if the direction of shifting by at least one pixel portion, on the screen, is taken to be a shifting direction in either an upward direction or a downward direction.

Still further, the three-dimensional object can be a fixed object and/or a moving object, as seen from a viewpoint created by the image corresponding to the object.

The above-described and other objects, features and advantages shall be made more clear with reference to the accompanying drawings in which an example of a preferred embodiment shall be described.

BRIEF DESCRIPTION OF THE DRAWINGS

FIG. 9A is a typical view showing a rendered state of a background which is rendered in a rendering area of the frame buffer;

FIG. 9B is a typical view showing a rendered state of images pertaining to a far-distant object group over-written on the image of FIG. 9A;

FIG. 9C is a typical view showing a rendered state of the images after execution of a blurring process, with respect to the image of FIG. 9B;

FIG. 9D is a typical view showing a rendered state of images pertaining to a mid-distance object group over-written on the one-pass blurred image of FIG. 9C;

FIG. 9E is a typical view showing a rendered state of the images after execution of a blurring process, with respect to the image of FIG. 9D;

FIG. 9F is a typical view showing a rendered state of an images pertaining to a near-distance object group, over a composite image made up of a two-pass blurred image and the one-pass blurred image of FIG. 9E;

FIG. 11 is a line diagram for facilitating explanation of blur processing of a rendering area of the frame buffer;

FIG. 14 is a typical view showing a blurred image;

DETAILED DESCRIPTION OF THE PREFERRED EMBODIMENTS

Next, an embodiment of the present invention shall be explained with reference to the drawings.

Figure 1:
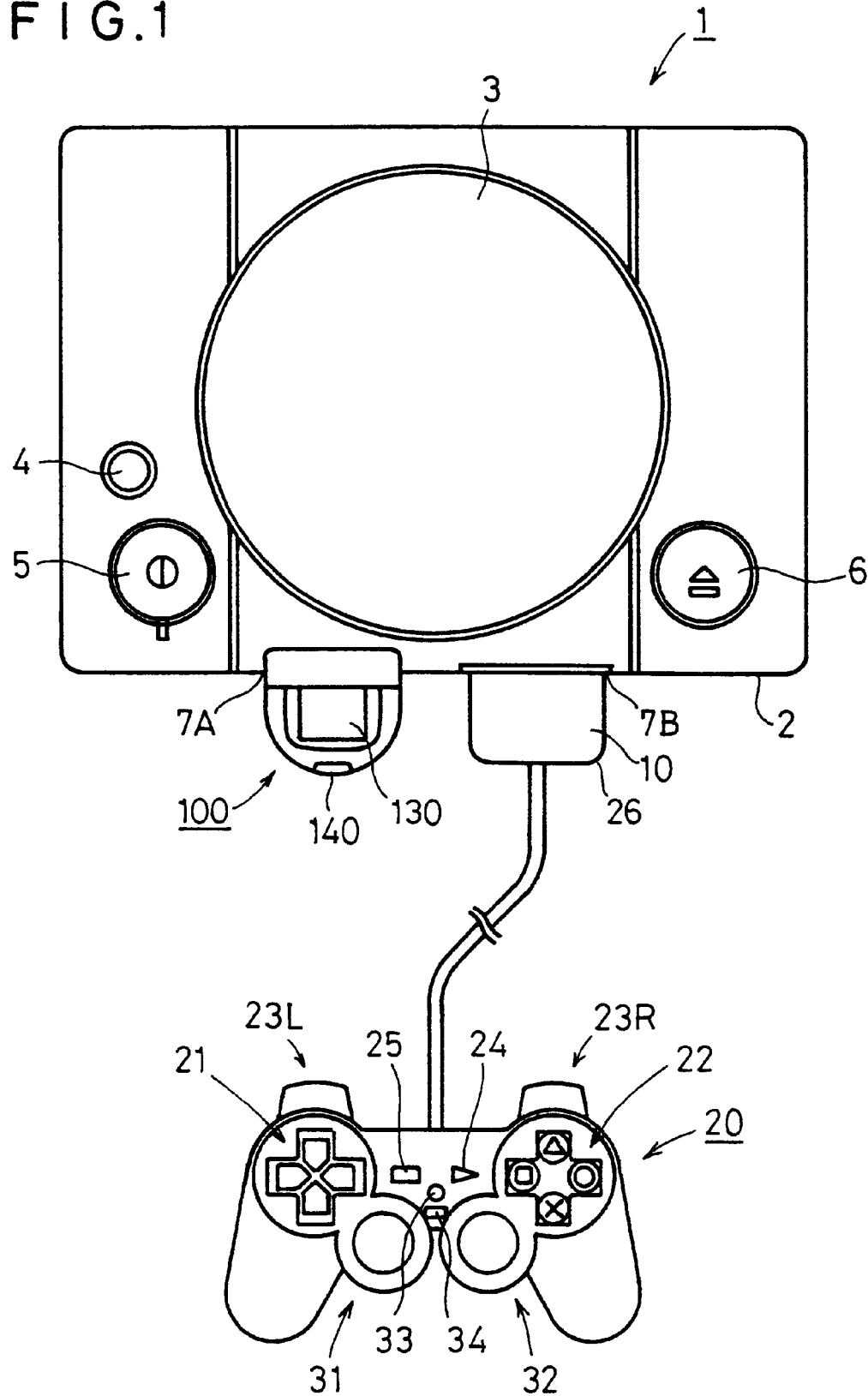
FIG. 1 is a plan view showing the exterior appearance of a video game apparatus to which an embodiment of the present invention is applied.

FIG. 1 shows an outer appearance of the structure of a video game apparatus 1 as an example of an entertainment system to which the embodiment of the present invention is applied.

The video game apparatus 1 is a device for reading out a program of a game or the like, which is recorded for example on an optical disk or the like, and which executes a game or the like in accordance with instructions from a user (game player). With execution of the game or the like, primarily the progression of the game, display and sound are controlled.

The main body 2 of the video game apparatus 1 comprises: a disk loading portion 3 accommodated in a central part of a casing for which the planar aspect thereof is substantially rectangular shaped, and which receives an optical disk, such as a CD-ROM or the like, as a recording medium for supplying an applications program; a reset switch 4 for optionally resetting a game; a power switch 5; a disk operating switch 6 for manipulating the insertion of the optical disk; and, for example, two slot portions 7A, 7B.

Further, the recording medium for supplying the application program is not limited to an optical disk, but for example, it is also acceptable for the applications program to be supplied through a communications link.

Respective individual operating devices (also called "controllers") 20, of which there are two in total, can be connected in slots 7A, 7B, whereby a competitive game or the like can be conducted by two players. Also, a memory card 10, or a portable electronic device 100 serving as a portable information terminal can be inserted into slots 7A, 7B.

Although in FIG. 1 a structure in which two system slots 7A, 7B are disposed has been shown by way of example, the number thereof is not necessarily limited to two systems.

The operating device 20 has first and second operating sections 21, 22, a left button 23L and a right button 23R, a start button 24, and a selection button 25, and furthermore, has operating sections 31, 32 which enable analog operations, a mode selecting switch 33 for selection of an operational mode for the operating sections 31, 32, and a display indicator 34 for displaying the selected operational mode. A non-illustrated mechanism for imposing vibrations is disposed in an internal part of the operating device 20.

Figure 2:
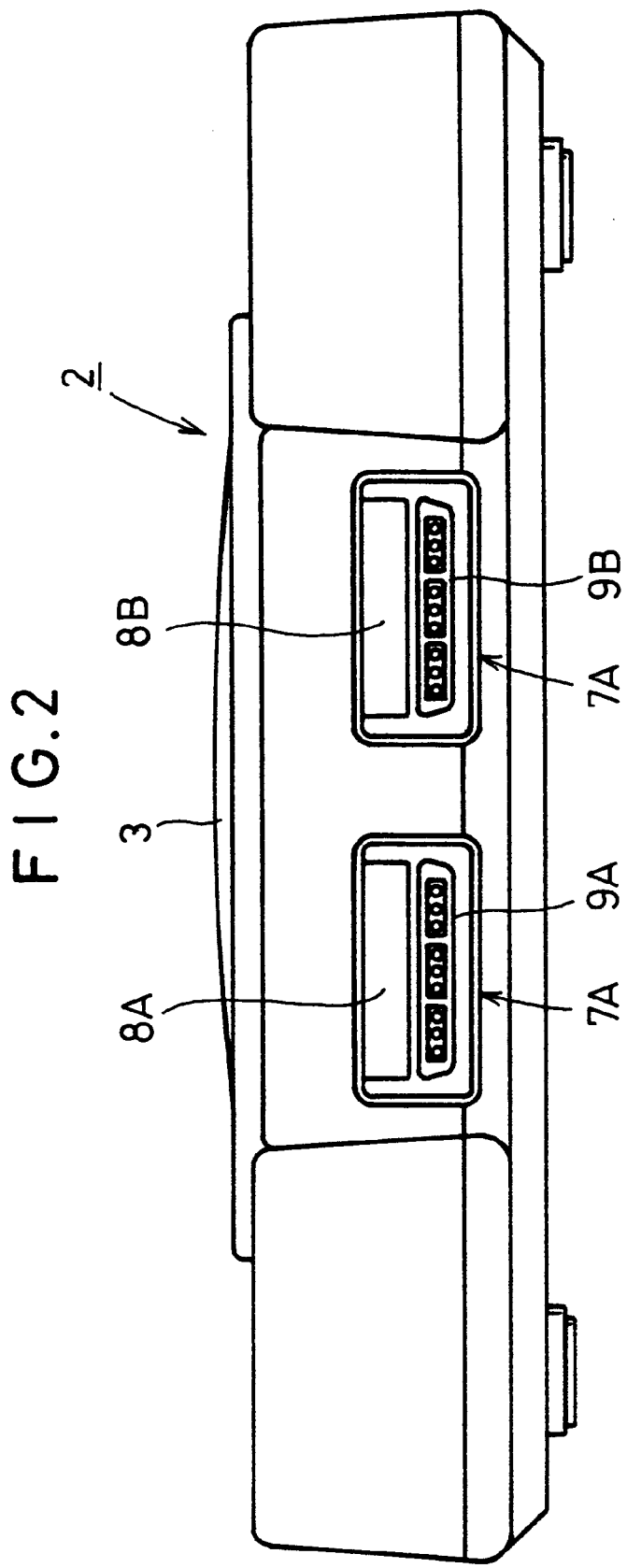
FIG. 2 is a front view showing a structure of a slot part of the video game apparatus main body.

FIG. 2 shows an aspect of the slots 7A, 7B which are disposed on a frontal surface of the main body 2 of the video game apparatus 1.

In the present invention, slots 7A, 7B are formed respectively in two levels, wherein memory card insertion portions 8A, 8B for insertion of a memory card 10 or portable electronic device 100 are disposed in the upper level, and controller connection ports (jacks) 9A, 9B, to which a connection terminal portion (connector) 26 (see FIG. 1) of the controller 20 is connected, are disposed in the lower level.

The insertion holes (slots) for the memory card insertion portions 8A, 8B are formed to have an elongated longitudinal shape in the lateral direction, wherein the corners of both ends of the lower side are rounded as compared to the corners of both ends of the upper side thereof, forming a structure in which the memory card 10 or portable electronic device 100 cannot be inserted in a mistaken orientation. Further, shutters are disposed in the memory card insertion portions 8A, 8B on an interior part thereof which protect the connecting terminals for attaining election connections.

On the other hand, the controller connecting parts 9A, 9B are formed by a structure in which both end corners of a lower side of the insertion holes, which are made to have an elongated longitudinal shape in the lateral direction, are formed to be more rounded when compared with both end corners of the upper side thereof, so that a connecting terminal portion 26 of the controller 20 is not connected in a mistaken orientation. Further, the insertion holes are made different from the memory card insertion portions 8A, 8B so that the memory card 10 or portable electronic device 100 will not be mistakenly inserted therein.

Figure 3:
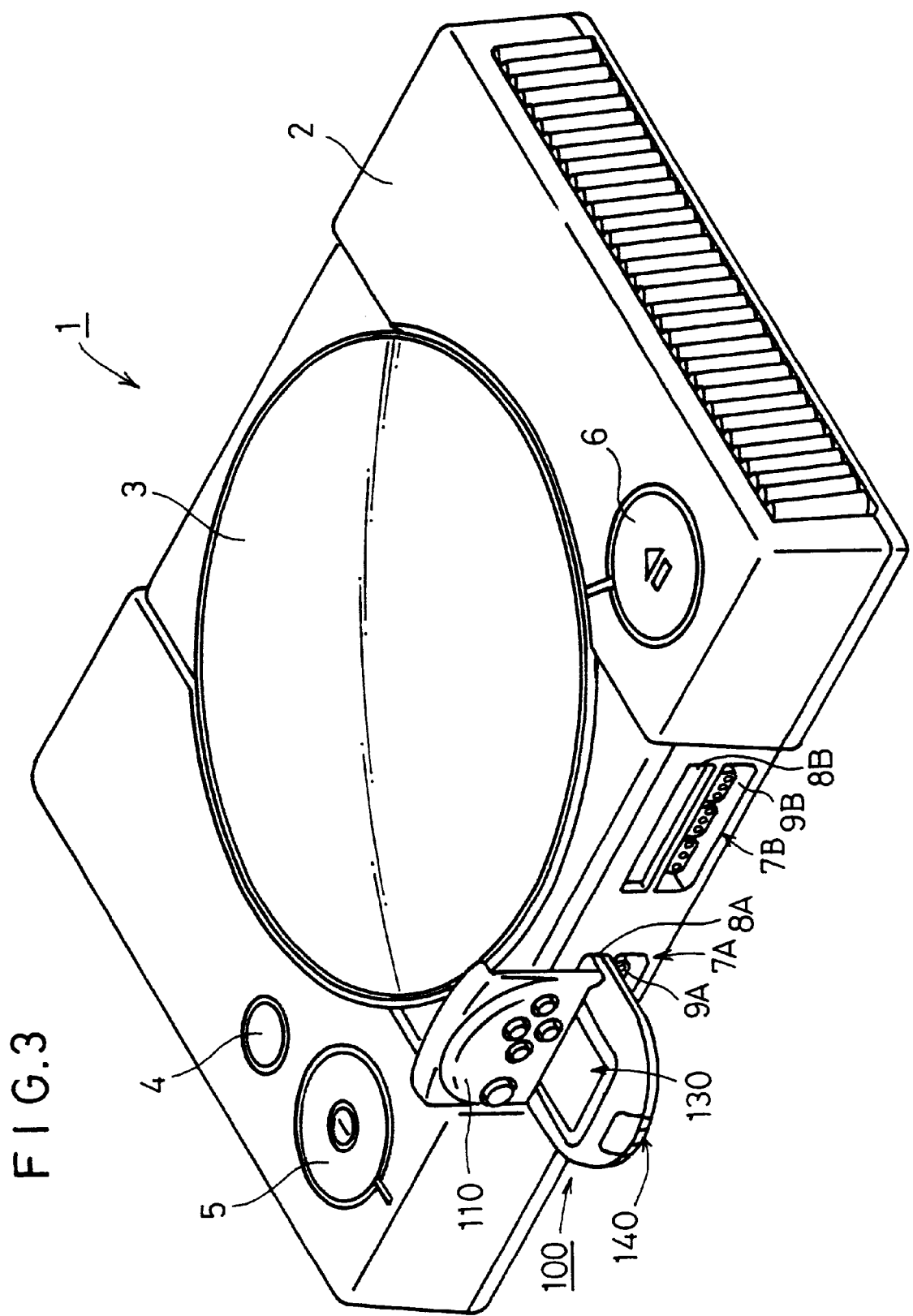
FIG. 3 is a exterior perspective view of the video game apparatus main body.

FIG. 3 illustrates a state in which a portable electronic device 100 is inserted in the memory card insertion portion 8A of the a slot section 7A on the frontal plane of the video game apparatus 1.

Figure 4:
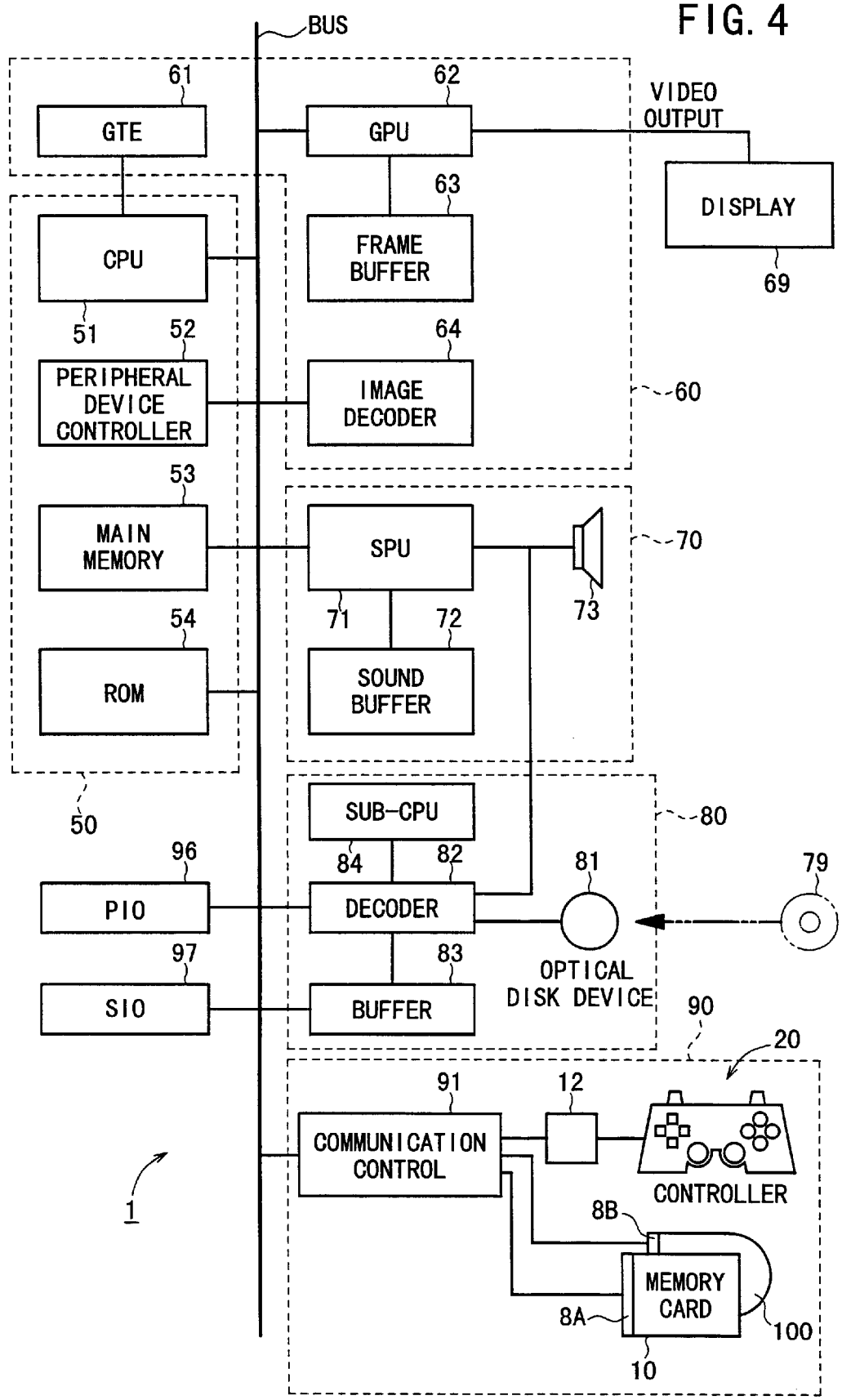
FIG. 4 is a electrical block diagram showing a detailed structural example of a principal part of the video game apparatus.

FIG. 4 is a block diagram showing an example of an outline circuit structure of essential elements of the above-described video game apparatus 1. A display 69, such as a television, is connected to the video game apparatus 1.

The video game apparatus 1 is of a configuration comprising: a control system 50 composed of a Central Processing Unit (CPU) 51 and its peripheral equipment, etc.; a graphics system 60 composed of a picture processing unit (Graphics Processing Unit, GPU) 62 for carrying out rendering with respect to a frame buffer 63, etc.; a sound system 70 composed of a Sound Processing Unit (SPU) for generating music or sound effects, etc.; an optical disk control unit 80 for carrying out control of an optical disk 79 on which an applications program is recorded; a communications control unit 90 for carrying out control of input/output of data from a memory card 10 for storing game settings, etc. and signals from the controller 20 to which instructions from a user are input, or input/output of data from a portable electronic device 100; and a bus (BUS) or the like to which the respective portions are connected.

The above-mentioned control system 50 comprises: a CPU 51; a peripheral equipment control unit 52 for carrying out interrupt control or control for Direct Memory Access (DMA) transfer, etc.; a main memory (main memory unit) 53 composed of a Random Access Memory (RAM); and a Read Only Memory (ROM) 54 in which a program making up the so-called operating system, or the like, for carrying management of the main memory 53, the graphics system 60, sound system 70, etc., is stored. Further, concerning the main memory 53 referred to herein, it is to be noted that a program on this memory is capable of being executed.

The CPU 51 executes the operating system stored in the ROM 54 to thereby control the entirety of the video game apparatus 1, and constitutes, for example, a 32-bit RISC-CPU.

Further, the video game apparatus 1 is adapted so that when power is turned ON, the CPU 51 of the control system 50 executes the operating system stored in ROM 54 so that the CPU 51 carries out control of the graphics system 60 and/or sound system 70., etc. Moreover, when the operating system is executed, CPU 51 carries out an initialization of the entirety of the video game apparatus 1 such as confirmation of operations, etc., thereafter to control the optical disc control unit 80 to execute an applications program of a game or the like which is recorded on the optical disk 79 accommodated in a disk receiving section 3 (see FIGS. 1 and 3). Upon execution of the game program or the like, the CPU 51 controls the graphics system 60 and/or sound system 70, etc., in accordance with user inputs to control the display of pictures and/or the generation of sound effects and music.

Further, the above-mentioned graphics systems 60 comprises a Geometry Transfer Engine (GTE) 61 for carrying out coordinate transform processing which includes a perspective projection conversion, etc., a GPU for carrying out rendering in accordance with rendering instructions from the CPU 51, a frame buffer 63 for storing pictures rendered by the GPU 62 and for which, in principle, the image is renewed for each generation of an image switching signal of a vertical synchronization signal Vsync, and a picture decoder 64 for decoding picture data which has been compression-encoded by an orthogonal transform such as discrete cosine transform or the like. In this case, the image which is rendered in the frame buffer 63 is made a video output via the GPU 62, and this video output is supplied through output terminals to a display means 69 serving as a monitor which is an image display device, for example a television. The image which is displayed on the screen of the display (which may include three-dimensional images) is renewed at each vertical synchronization signal Vsync.

The GTE 61 comprises a parallel arithmetic mechanism for executing in parallel, e.g., plural operations, and is adapted to have an ability to carry out, at high speed, coordinate transforms (for effecting perspective projection, a perspective projection conversion for converting an image of three-dimensional space into an image of two-dimensional space is included), light source calculations, and matrix or vector operations, etc. in accordance with operation requests from the CPU 51. More specifically, in the GTE 61, in the event of an operation for carrying out flat shading to paint, e.g., a triangular polygon by the same color, about 1,500,000 polygon coordinate operations at a maximum can be carried out in one second. Thus, in the video game apparatus 1, load on the CPU 51 is reduced and high speed coordinate operations can be carried out. In the present embodiment, the CPU 51, GTE 61 and GPU 62 constitute the rendering control means.

The GPU 62 carries out rendering operations for polygons, etc., with respect to the frame buffer 63 in accordance with rendering instructions from the CPU 51. The CPU 51 can carry out approximately 360,000 polygon rendering operations at a maximum in one second.

Further, the frame buffer 63 is comprised of a so called dual port RAM, and is adapted to have the ability to carry out rendering operations from the GPU 62 or transfers from the main memory 53, and perform read-outs for display at the same time. The frame buffer 63 has, for example, a capacity of 1 M-bytes, and is handled as a matrix having 1024 pixels in the lateral direction and 512 pixels in the longitudinal direction, each respectively having 16 bits. Moreover, in the frame buffer 63, there are provided, in addition to the display area (referred to as a rendering area) which is output as a rendering area rendered as a screen image and a video output, a CLUT area in which there is stored a Color Look-Up Table (CLUT) to which reference is made when the GPU 62 carries out polygon rendering operations, and the like, and a texture area in which there is stored material (i.e. textures) which are inserted (mapped) into the polygons, etc., which are rendered by the GPU 62 after undergoing a coordinate conversion at the time of the rendering operation. Material for a two-dimensional background image of a farthest-most scene in which the sky, clouds and the like are displayed is also stored in the texture area.

The CLUT area and the texture area are adapted to be dynamically changed in accordance with changes, and the like, of the display area.

Moreover, the above-described GPU 62 is adapted to have an ability to carry out, in addition to the above-described flat shading, glow shading for performing an interpolation from the color of a vertex of a polygon, to determine the color within the polygon, and texture mapping for attaching a texture stored in the texture area onto the polygon. In the case of performing such glow shading or texture mapping, the GTE 61 can carry out approximately 500,000 polygon coordinate operations, at a maximum, in one second.

Further, the picture decoder 64 decodes picture data of a still picture or a moving picture which is stored in the main memory 53 by a control from the CPU 51, to store the same in the main memory 53.

Moreover, the reproduced picture data is stored in the frame buffer 63 through GPU 62 so that it can be used as the background for a picture rendered by the above-described GPU 62.

The above-described sound system 70 comprises an SPU 71 for generating music or sound effects, etc., on the basis of instructions from CPU 51, a sound buffer 72 into which waveform data, or the like, is recorded by the SPU 71, and a speaker 73 for outputting the music or sound effects, etc., which are generated by the SPU 71.

The above-mentioned SPU 71, for example, includes an ADPCM decoding function for reproducing sound data which has been caused to undergo an ADPCM (Adaptive Differential PCM) processing, e.g., 16 bit sound data is processed as a 4 bit difference signal, a reproducing function for reproducing the waveform data stored in the sound buffer 72 to thereby generate a sound effect or the like, and a modulation function for modulating the waveform data stored in the sound buffer 72 for reproducing the same.

By providing such functions, the sound system 70 can be used as a so-called sampling sound source, for generating musical or sound effects and the like, on the basis of waveform data which is recorded in the sound buffer 72 by an instruction from the CPU 51.

The above-mentioned optical disk control unit 80 comprises an optical disk unit 81 for reproducing a program or data, etc., which is recorded on an optical disk 79, a decoder 82 for decoding the program or data, etc., in a state in which, for example, Error Correction Codes (ECC) have been added thereto, and a buffer 83 for temporarily storing data from the optical disk unit 81 to thereby allow a read-out operation of the data from the optical disk 79 to be conducted with high speed. A Sub-CPU 84 is connected to the above-described decoder 82.

Moreover, as sound data which is recorded on the optical disk 79 and which is read out by the optical disk unit 81, there is so-called PCM data in which sound signals have been caused to undergo an analog/digital conversion, in addition to the above described ADPCM data.

As the ADPCM data, sound data which is recorded in a state in which, for example, a difference of 16-bit digital data is represented by 4-bits, is decoded into 16-bit digital data by the decoder 82, and is then supplied to the above-mentioned SPU 71, where processing such as digital/analog conversion, and so forth, is implemented by the SPU 71. The sound data, thus processed, is used for the purpose of driving the speaker 73.

Further, as PCM data, sound data which is recorded, for example, as 16-bit digital data, after decoding by the decoder 82, is used for the purpose of driving the speaker 73.

Further, the communication control unit 90 comprises a communications controller 91 for carrying out control of communications with the CPU 51 through the BUS, and wherein controller connection sections 9A, 9B to which a controller 20 for input of instructions from the user is connected, and memory card insertion sections 8A, 8B to which a memory card 10 or a portable electronic device 100 may be connected as auxiliary memory units for storing status data of the game, are disposed in the communications controller 91.

The controller 20 which is connected to the controller connection section 9A, 9B includes, for example, sixteen designation keys for the purpose of inputting instructions from the user to transmit, at about sixty times per second, the state of such designation keys to the communications controller 91. In addition, the communications controller 91 transmits the state of the designation keys of the controller 20 to CPU 51.

Thus, instructions from the user are input to the CPU 51. In response thereto, the CPU 51 carries out processing in accordance with the instructions from the user, on the basis of a game program, or the like, which is being executed.

In this case, for performing reading out of a program, display of pictures, or rendering operations, and the like, it is necessary to transfer a large quantity of picture data between the main memory 53, GPU 62, picture decoder 64 and the decoder 82, etc., at high speeds. In view of this, in the video game apparatus 1, there can be carried out a so-called DMA transfer, to directly undertake transfer of data between the main memory 53, GPU 62, picture decoder 64 and the decoder 82, by control from the peripheral device control unit 52 without necessity of intervention by the CPU 51 as described above. Accordingly, load on the CPU 51 due to data transfer can be reduced, and as a result, high speed data transfer can be carried out.

Moreover, when it is necessary to store status data, etc., of a game being executed, CPU 51 transmits such data to the communications controller 91, wherein the communications controller 91 writes the data from the CPU 51 onto the memory card 10 or portable electronic device 100 which functions as a portable information terminal, and which is inserted into the slot of memory card insertion portion 8A or memory card insertion portion 8B.

Herein, the memory card 10 comprises a main interface for connection to the video game apparatus 1, and a memory interface for input/output of data to and from an internal non-volatile memory.

Further, the portable electronic device 100 comprises a main interface for connection to the video game apparatus 1, a memory interface for input/output of a program or data to and from an internal non-volatile memory, an operating portion having a plurality of operating elements, a display portion 130 formed by a liquid crystal display (LCD) or the like, and a window section 140 for performing wireless transmission by a wireless transmission means, for example, infrared rays. The shape and dimensions of the connector portion of the portable electronic device 100 are the same as those of the memory card 10 used by the video game apparatus 1.

A protective circuit for preventing electric breakage is included within the communications controller 91 (see FIG. 4). The above-mentioned memory card 10 or portable electronic device 100 are separated from the bus 100, and can be attached or detached in a state wherein the power of the apparatus main body is turned ON. Accordingly, in a case in which the memory capacity of the memory card 10 or portable electronic device 100 is insufficient, or the like, a new memory card 10 can be inserted without interrupting the power supply of the apparatus main body. As a result, a new memory card 10 can be inserted in a state in which game data which is required to be backed up is not lost, and necessary data can be written into the new memory card 10.

Moreover, a parallel I/O interface (PIO) 96 and a serial I/O interface (SIO) 97, are interfaces for connection of the memory card 10 and portable electronic device 100 with the video game apparatus 1.

Figure 5:
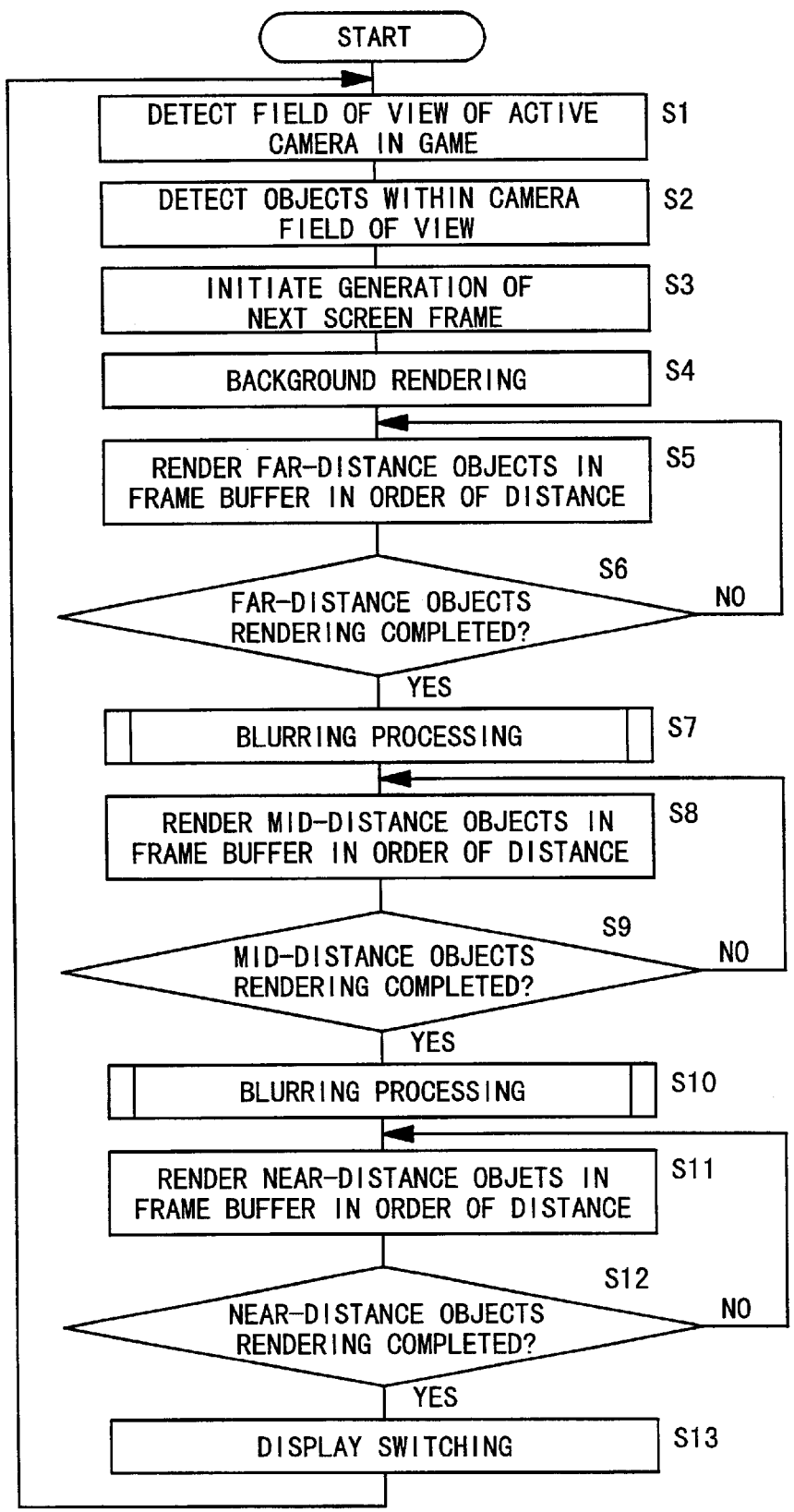
FIG. 5 is a flow chart showing process steps for image processing according to an embodiment of the invention.

Next, with reference to the flow chart shown in FIG. 5, an explanation shall be given concerning an image processing which includes a blurring process (also called partial blur processing or focus partial shift processing), of the video game apparatus 1 which is constructed as described above. Further, the flow chart of FIG. 5 is a flowchart for supplying an operational explanation in a state in which a part of an applications program stored on the optical disk 79 is already downloaded into a main memory 53, the applications program is executed in the CPU 51 and a game has already been opened by the user (game player).

In STEP S1, a field of view of an active camera in a game which is currently under use is detected corresponding to a state of progression of the game. In actuality, there exists a plurality of such cameras in the game, wherein a currently valid camera, more specifically the active camera, is detected from a position of the character inside the game (i.e. an object of a person, vehicle, or the like).

Next, in STEP S2, an object (three-dimensional image) from inside the field of view of the active camera is detected.

Figure 6:
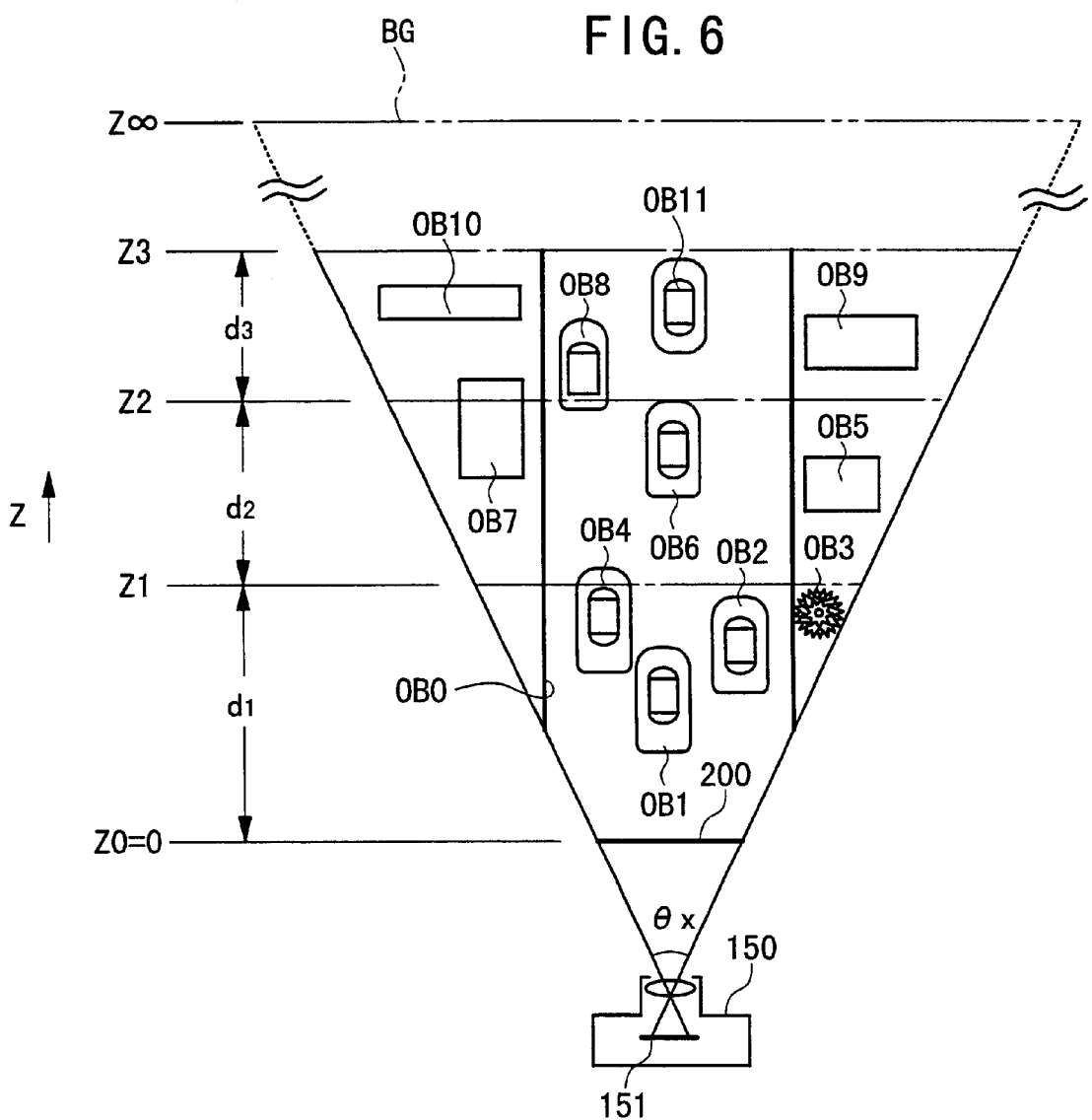
FIG. 6 is a typical view for furnishing an explanation of an aspect by which an object is divided into near-, mid- and far-distance object groups.

More specifically, as illustrated by the planar perspective view of FIG. 6, taking the field of view from the perspective of the active camera to be θ (the vertical directed field of view [image angle] is θy, and the lateral directed field of view [image angle] is θx), the objects (three-dimensional objects) which can be observed therein are detected.

In STEP S2, taking the screen 200 of the display 69 as the origin Z0 (Z=Z0=0) of a depth (Z-axis) coordinate, and corresponding to a depth amount Z with the origin point Z0 serving as a standard, for each of depth amounts Z1, Z2 and Z3 (Z1<Z2<Z3), objects OBn (n=0–10) are separated and detected as belonging respectively to a near-distance object group (near-distance image group) 152, a mid-distance object group (mid-distance image group) 154, or a far-distance object group (far-distance image group) 156.

As discussed hereinafter, in FIG. 6 the depth amount Z=Z∞ indicates the position of a background BG as a two-dimensional image.

Further, FIG. 6 shows a typical view as seen from an overhead vertical orientation in which the active camera 150 has a line of sight oriented horizontally, and therefore the vertical line of sight θy is not shown.

Objects OBn, respectively, are three-dimensional objects (according to this embodiment, surface models) where, in actuality, each object OBn is divided into polygons wherein a topmost coordinate of the polygons, along with the color at the topmost point, are recorded associatively on the optical disk 79, and as necessary, are downloaded and stored in the main memory 53. From this meaning, the optical disk 79 and main memory 53 may be referred to as a three-dimensional object storage means.

In FIG. 6, from among the objects OBn (n=0–11) which are respectively typically drawn, an object OB0, for example, a road (here, the running path of a car) is displayed, objects OB1, OB2, OB4, OB6, OB8 and OB11, respectively, show a car which is travelling in a rearward direction (depth direction) into the screen, object OB3 shows a roadside tree (tree), and the remaining objects OB5, OB7, OB9 and OB10 respectively show construction items such as buildings and so forth.

In this case, for example, observing from the viewpoint 151 generated by the image, when the active camera is still, objects OB0, OB3, OB5, OB7, OB9 and OB10 are relatively fixed items, whereas objects OB1, OB2, OB4, OB6, OB8 and OB11 are relatively moving items.

In the example of FIG. 6, five objects OB0–OB4 are included in the near-distance object group 152 between depth amounts Z0–Z1 (area length d1), six objects OB0 and OB4–OB8 are included in the mid-distance object group 154 between depth amounts Z1–Z2 (area length d2), and six objects OB0 and OB7–OB3 are included in the far-distance object group 156 between depth amounts Z2–Z3 (area length d3).

Herein, it is necessary to keep in mind the point that the object OB0 making up the road is included in all of the near-distance object group 152, the mid-distance object group 154 and the far-distance object group 156. Further, it is important to keep in mind that object OB4 exists in a straddled state over the near-distance object group 152 and the mid-distance object group 154, whereas objects OB7 and OB8 exist in a straddled state over the mid-distance object group 154 and the far-distance object group 156.

Further, one should bear in mind that it is acceptable for a background BG, such as the sky or the like, to exist in a position for which the depth amount thereof is infinity (an infinite distance point, wherein the depth amount Z is Z=Z∞). On the screen, clouds which exist in an upper orientation of the sky may also be included in the background BG, and it is also acceptable for three-dimensional objects, for example, to be included in far-distance object 156. Of course, it is also acceptable for three-dimensional objects to exist between the depth amounts of Z3 and Z∞.

Due to the simplified nature of this embodiment, the background BG is a blue sky, having clouds included within the blue sky. The images of clouds, when necessary, can also possess a texture in a predetermined region of the frame buffer 63.

Figure 7:
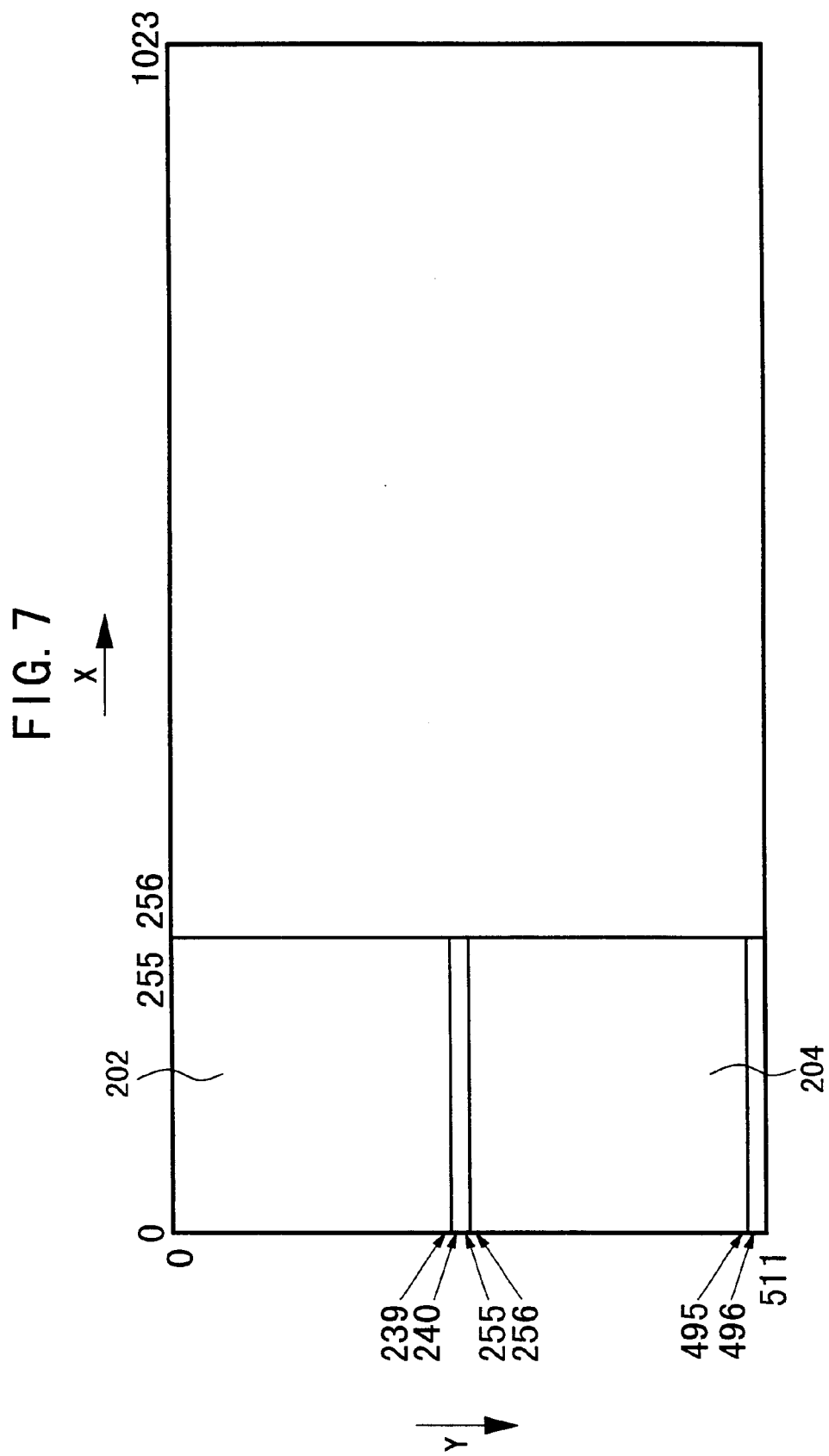
FIG. 7 is a line diagram for furnishing an explanation of a rendering area of a frame buffer.
Figure 8:
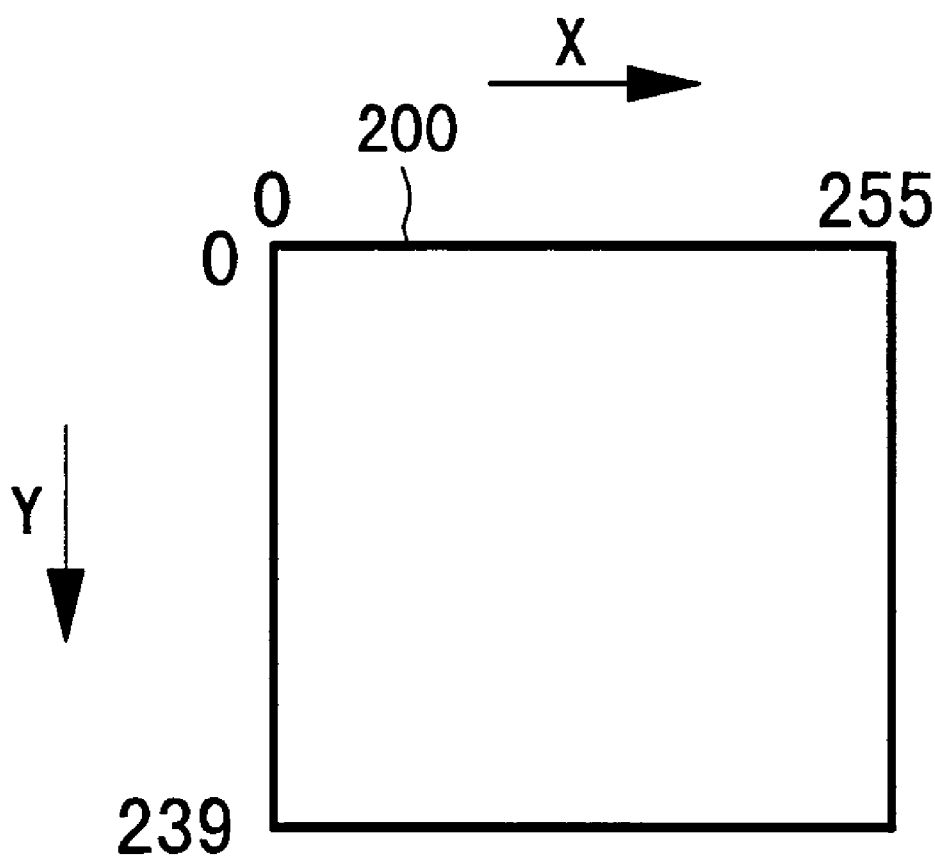
FIG. 8 is a line diagram for furnishing an explanation of a screen region.

In this case, as shown in FIG. 7, two rendering areas 202, 204, corresponding to two screen portions of a 256-pixel× 240-pixel screen 200, which are display regions of the display 69 shown in FIG. 8, are set in the frame buffer 63 which possess a 1023-pixel×512-pixel memory area.

One of the rendering areas 202 of the frame buffer 63, as shown in FIG. 7, is set at an address range (x: 0–255, y: 0–239) of the frame buffer 63, and another of the rendering areas 204 is set an another address range (x: 0–255, y: 256–495).

As a result of being structured in this manner, when an image (which herein is a screen frame) that is rendered in one rendering area 204 of the frame buffer 63 is displayed on a screen 200 of the display 69 (at this time, it may also be said that the rendering area 204 is a display area 204), an image which is to be displayed next on the screen is rendered in the other rendering area 202 of the frame buffer 63. More specifically, two images (two screen frames) which are rendered in the rendering areas 202, 204 of the frame buffer 63 are alternately displayed on the screen 200. Such alternate switching of screen frames is set so as to be switched upon a first vertical synchronizing signal Vsync after completion of rendering.

During the first processing from the above-mentioned Step S1 to the below-mentioned Step S12, for example, the image (screen frame) which is rendered in the lower side rendering area 204 in FIG. 7, is displayed on the display area (also called the screen) 200 of the display 69.

At this point, in Step S3, with respect to the other rendering area 202, generation of an image to make up the next horizontal scan display (screen frame) is initiated. In this case, the GPU 62, referring to a display list (screen list for subsequent displays) which is generated by the CPU 51 with assistance of the GTE 61, generates the image.

In STEP S4, a background BG, which is a farthest most scene, is rendered with respect to the rendering area 202, taking the viewpoint 151 as a standard.

FIG. 9A shows typically a rendering area 202 of the frame buffer 63 in which there is written a background BG image 155 as an image in which, on the overall screen, clouds 300–303 are floating on a blue sky. If the pixel values of the image 155 of the blue sky part thereof are expressed as RGB values, for example, the background BG is written in as (R, G, B)=(0, 0, 255), and for pixel values for the image 155 of the white cloud image 300–303 part thereof, the background BG is written in as (R, G, B)=(255, 255, 255).

Next, in Step S5, objects OBn which have been classified and detected according to Step S2 are referred to (see FIG. 6), and from among objects OB0 and OB7–OB11 which are included within the far-distance object group having a largest depth amount Z following depth amount Z=Z∞, in order of a farthest (largest depth amount) object, or more precisely in order of objects OBn which reside at positions which are farther than a distance terminus (within one object, the end part thereof having the largest depth amount Z) of an object OBn, more specifically in the order of object OB0, object OB11, object OB10, object OB9, a portion of object OB8 and a portion of object OB7, an image 156Ia (i.e. an image of two-dimensional space which is converted from images in three-dimensional space) which is attained by perspective projection conversion of objects OB0, OB11, OB10, OB9, a portion of object OB8 and a portion of object OB7, respectively, from a position of the viewpoint 151 with the screen 200 as a standard, is overwritten and rendered at a position which corresponds to the rendering area 202 in which the image 155 of FIG. 9A is drawn (see FIG. 9B).

As understood from FIG. 9B, because of being rendered by overwriting, for example, the cloud image 303 becomes concealed by a backside of the building image 306 which corresponds to object OB10. Further, for image 308 pertaining to object OB7 and image 310 pertaining to object OB8, only parts from within the depth length of d2 are rendered. Further, for image 308 pertaining to object OB7 and image 310 pertaining to object OB8, only surfaces (surfaces formed by polygons) which are visible from the viewpoint 151 are rendered, and surfaces which are oriented toward the depth direction of the screen are not rendered. Further, the surfaces formed by polygons are surfaces of objects OBn obtained by surface modeling.

The image shown by FIG. 9B, for which the image 156Ia of the far-distance object group 156 is overwritten on the background BG image 155, to simplify understanding, henceforth shall be referred to as the far-distance object group image 156a.

From inside the far-distance object group 156, because the distance terminus of the object OB0 is the depth amount Z3 and the near terminus is the depth amount Z2, the object OB0 can be judged as being the object having a farthest distance terminus from among the objects OBn of the far-distance object group 156. In the order of objects for which the distance terminus is farthest, the objects are overwritten and rendered in the rendering area 202.

Next, in Step S6, it is judged whether the rendering on rendering area 202 of frame buffer 63, for all objects OBn residing in the far-distance object group 156, has been completed.

If the judgement in Step S6 is affirmative, then the blur processing of Step S7 is executed.

Figure 10:
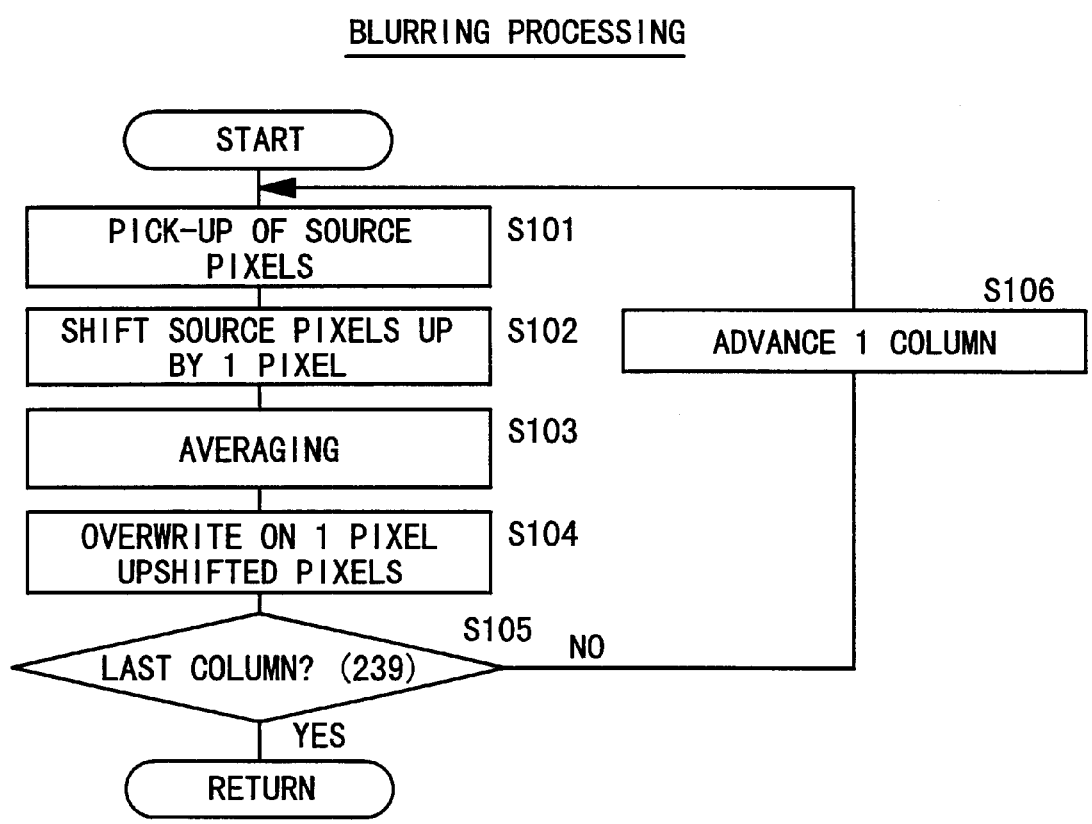
FIG. 10 is a flow chart showing steps for blur processing.

FIG. 10 shows a flow chart (sub-routine) of a detailed succession of steps for blur processing, which is executed in Step S7.

FIG. 11 shows a pixel arrangement (array) for a rendering area 202 which forms the object of blur processing.

Rendering area 202 is structured as a 240 line, 256 column matrix, shown by pixels anm=a00–a239255 (these also express pixel values, although in actuality each of the pixel values is expressed by a respective RGB value).

For blur processing, in Step S101, the pixels a10–a1255 of the second line of source pixels P (anm) are picked up (i.e. the second line of pixels a10–a1255 is focused on) and each pixel a10–a1255 of the picked up (focused upon) second row is shifted up by one pixel portion in Step S102.

In Step S103, an average is taken between each of pixels a10–a1255 which have been shifted by one pixel portion, and each of the pixels a00–a0255 of the first line, which confront therewith along the same column (i.e. a semi-transparency formation processing is performed).

In Step S104, each of the pixel values, after having taken such an average, are written as the pixel values for the first column pixels a00–a025.

For a one-pass processing of steps S101–S104, for example, at the position of pixel a00, (a00+a10)/2 is written in as the pixel value. Similarly, at the position of pixel a0255, (a0255+a1255)/2 is written in as the pixel value.

Next, in Step S105, it is judged whether or not the current processing is for the last line (according to this embodiment, the 239th line), and in the case that it is not the last line, in Step S106, a pointer is referenced and the process is advanced by one line.

During subsequent processing of steps S101–S104, pixels a20–a2255 are overlaid on pixels a10–a1255, and respectively averaged pixel values {(a10+a20)/2 to (a1255+a2255)/2)} are assigned as the pixel values for pixels a10–a1255. Similar processing is conducted until the last line of pixels a2390–a239255 is reached. However, the values of pixels a2390–a239255 belonging to the last line are left at their original values.

Figure 12:
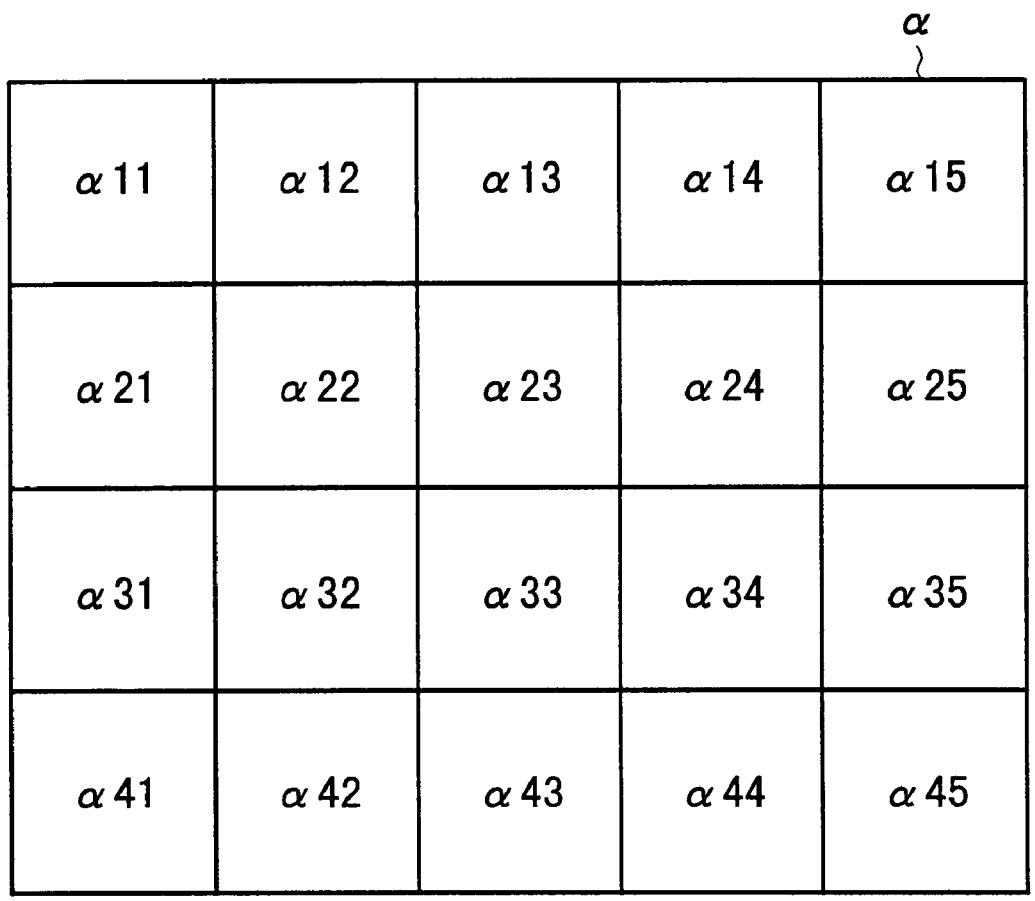
FIG. 12 is a typical view showing a source image prior to blur processing.

Concerning such blur processing, an explanation shall be given at this point concerning an image a corresponding to a specified object which is made up from a 4×5 block of pixels α11–α45, as shown in FIG. 12. Herein, for ease of understanding, the color (pixel value) of the pixels α11–α45 of the image a corresponding to the specified object are all red (R, G, B)=R(255, 0, 0), and the color (pixel value) of surrounding pixels (not shown) of the image α are blue (R, G, B)=B(0, 0, 255).

During the blur processing of Steps S101–S106 shown in FIG. 10, as a result, first, it can be thought of as though the entire image α corresponding to the specified object is shifted upward by one pixel and is overlaid upon the original image α.

Figure 13:
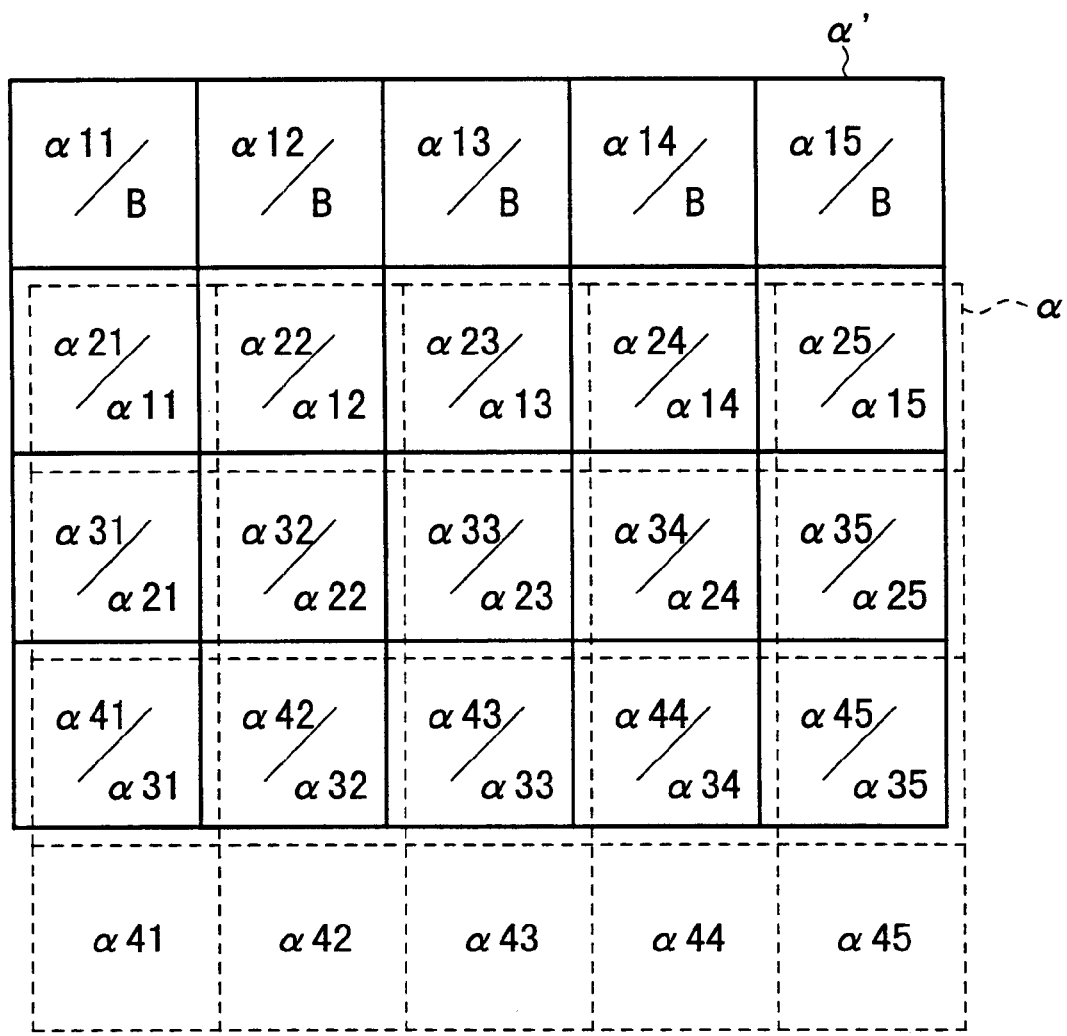
FIG. 13 is a typical view showing state of a blurred image made up of a one-pixel shifted source image overlaid onto the source image.

FIG. 13 is a typical view showing a drawing of the image a illustrated in FIG. 12 together with an image α' which has been shifted up by one pixel.

Each pixel α11–α15 of the first line making up the image α' is overlaid on a blue (R, G, B)=B(0, 0, 255) pixel.

FIG. 14 shows the pixel values of an image β after averaging processing (semi-transparency formation processing) of image a and image α'. In the image β, it is seen that the overall size of the image becomes larger by one pixel portion only in the upward direction. At this time, the pixel values of the uppermost (first) column are the pixel values of red (R, G, B)=R(255, 0, 0) and blue (R, G, B)=B(0, 0, 255) after semi-transparency formation processing, and hence become magenta (R, G, B)=M(128, 0, 128) in color; whereas the pixel values of the second through fifth lines, also after semi-transparency formation processing, are the semi-transparency processed uniform pixel values, and thus, the pixel values are the same as the red pixels of the image α. In this way, for the processed image β, the image of the first line which is changed in color is perceived as being a pseudo-blurred image.

Of course, the image area of the image α need not be a single red color, but for the case of an image having a pattern, for the image β in the case that one-pixel shifting semi-transparency formation processing is performed, not only the first line thereof, but the pattern also results in a patterned image having the pattern therein blurred as well.

In general, for the semi-transparency formation processing, when an image of pixels which confront the pixels of positions in an image A(R, G, B) are taken as A'(R', G', B'), it is understood how to calculate the image B(Rb, Gb, Bb) after semi-transparency formation processing in accordance with a mutually-additive averaging by the following equation (1).

$$B(Rb, Gb, Bb)=B\{(R+R+)/2, (G+G')/2, (B+B')/2\} \quad (1)$$

Further, in the present embodiment, averaging by such semi-transparency formation processing need not be an additive averaging divided by two (50%:50%), but it is also acceptable to have such division performed by a divisor other than 2, or an averaging based on applying respective weightings.

More specifically, it is also acceptable to perform calculation of the resultant image B(Rb, Gb, Bb) after semi-transparency formation processing of image A(R, G, B) and image A'(R', G', B') by means of mutually-additive averaging as shown by the following equation (2), in which the RGB values are calculated by respectively predetermined ratios. Moreover, in equation (2) the value of x is taken as being $0 \leq x \leq 1$.

Further, in this embodiment, the direction of pixel shifting is by one pixel in the upward direction, however, it is acceptable to be by one pixel in a downward direction as well. In the case that the display 69 employs a television as the monitor, which performs horizontal scanning and on which an image is formed on the television, because bleeding of color tends to be generated in the left and right directions (horizontal direction) of the screen, shifting not in a horizontal direction, but rather it is preferable to select one of an upward direction (vertical upward direction) or a downward direction (vertical downward direction) for which the effectiveness of focus blurring is high. Of course, shifting in any optional direction such as up, down, left or right, or in a radiating direction or the like, is possible depending on the display format of the display.

Further, as for the number of pixels by which shifting is done, in the one-pass blur processing of this embodiment, a one-pixel shifting is used. This is because, at the resolution (525 line) of current television monitors, for a greater than one-pixel shifting, it is highly possible that, rather than focus blurring, an effect of double-copying will occur. Of course, an optional predetermined pixel number portion can be determined by experimentation in accordance with the type of display used. However, it is preferable for shifting to be by at least one one-pixel.

In FIG. 9C, an image 156a' in the rendering area 202 after the blur processing of Step S7 is shown. In the blurred image 156a', the background BG image and the image 156a of the far-distance object group 156 shown in FIG. 9B become a one-pixel blurred image in an upward direction.

In Step S8, from among objects OB0 and OB4–OB7 that are included in the mid-distance object group 154 having a next largest depth amount Z, a farthest object ordering, or more precisely, an ordering of objects OBn which reside at positions which are farther than a distance terminus of an object OBn, more specifically in the order of object OB0, object OB7, object OB6 and object OB5, an image (i.e. three-dimensional→two-dimensional converted image) 154a which is attained by perspective projection conversion of objects OB0 and OB5–OB7, respectively, from the viewpoint 151, is overwritten on the screen 200 and rendered at a position which corresponds to the rendering area 202.

Further, inside the mid-distance object group 154, for object OB0 although the near terminus thereof is the depth amount Z1, the distance terminus thereof is the depth amount Z2, and therefor, from among objects Obn, it is judged to be the object for which the distance terminus thereof is farthest.

Next, in Step S9, it is determined whether rendering, on rendering area 202 of frame buffer 63, of all objects OBn residing in the mid-distance object group 154 has been completed.

If the judgement in Step S9 is affirmative, as shown in FIG. 9D, in the rendering area 202, a state is produced in which the one-pass blurred image 156a' of the far-distance object group which includes the background image BG, and a perspective projection converted image 154a of the mid-distance object group 154 for which blur processing has yet to be performed, are written into the rendering area 202.

Next, in Step S10, blur processing is executed again. More specifically, with respect to the rendering area 202 in which the image shown in FIG. 9D has been rendered, the blur processing pertaining to the sub-routine steps, from Step S101 until Step S105, as shown in FIG. 10, is executed.

As a result of the fact that additional blur processing is performed on the blurred image 156a' shown in FIG. 9D which is rendered in rendering area 202, as shown in FIG. 9E, the blurred image 156a' of the background image BG containing far-distance object group 156 becomes a blurred image 156a" which is shifted upwardly further by one pixel portion, and the one-pass blur processed image 154a' of the mid-distance object group 154, for which image 154a of the mid-distance object group 154 has been shifted upwardly by one pixel, becomes rendered over the two-pass blurred image 156a".

In this manner, as a result of performing blur processing twice, an effect is achieved in which the blurred image 156a" pertaining to the far-distance object group 156 appears to be still further blurred (i.e. is seen to be blurred by one pixel portion more than) than the blurred image 154a' which pertains to the mid-distance object group 154.

Next, in Step S11, from among the images 152a of the near-distance object group which make up the remaining objects, they are written in order of the farthest object into the rendering area 202 of the frame buffer 63, and in Step S12 it is judged that the rendering of images 152a of the near-distance object group 152 has been completed.

Figure 15:
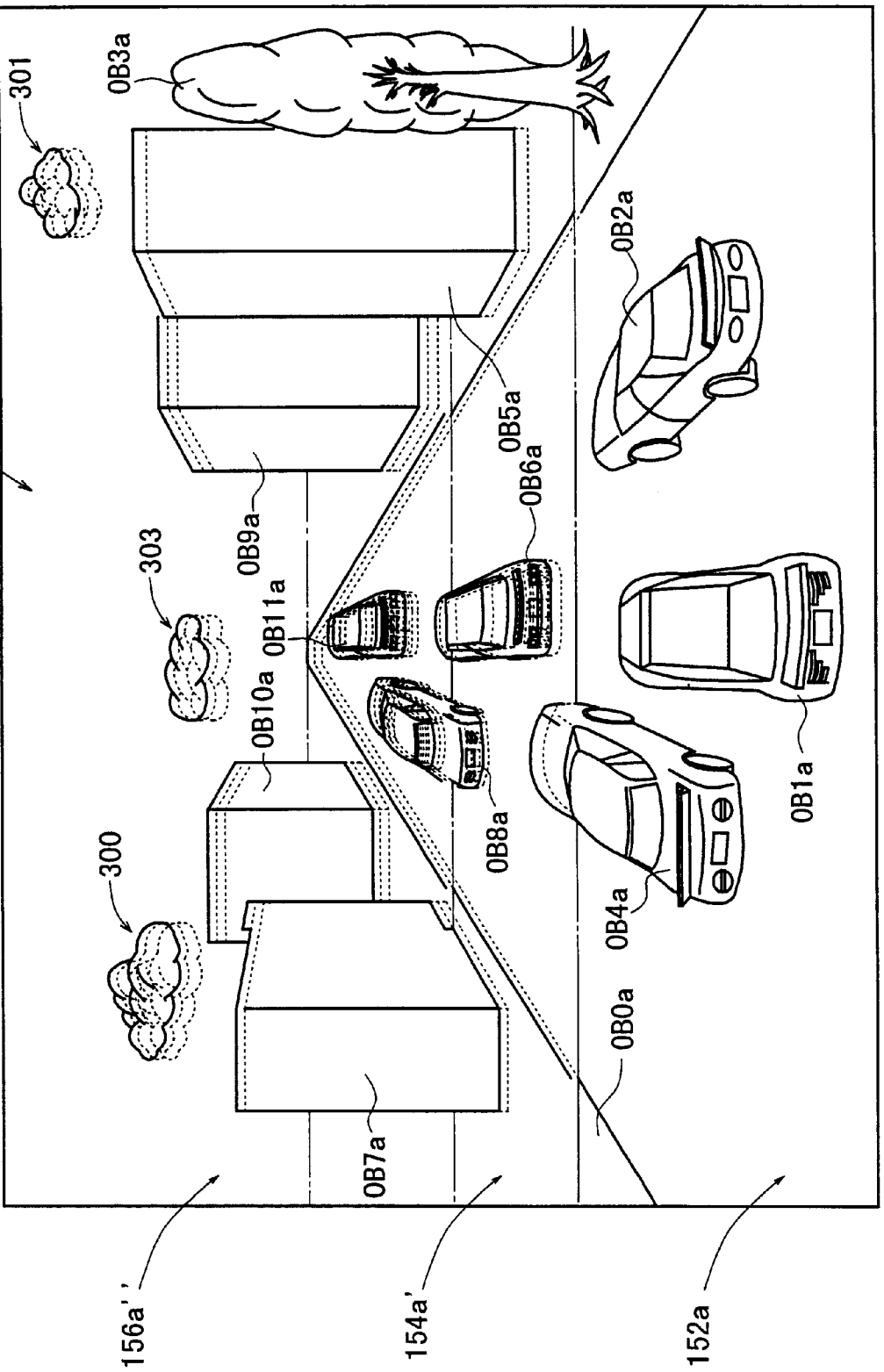
FIG. 15 is an expanded view of FIG. 9F, and a typical view showing an example of a screen display containing a blurred image according to this embodiment.

A state of the rendering area 202 at a point in time at which rendering is completed is shown in FIG. 9F. Further, an expanded view of FIG. 9F is shown by FIG. 15. Further, in the images of FIG. 9F and FIG. 15, for explaining the effect of blurring, the shifting amount is drawn exaggeratedly in comparison to the actual shifting amount. The actual shifting amount is by an upward two-pixel portion for the blurred image 156a" of the far-distance object group 156 which includes the background BG, and an upward one-pixel portion for the blurred image 154a' of the mid-distance object group 154.

Further, in FIG. 15, a code OBna to which an alphabetic character "a" is attached to the object OBn, for example a code of OB10a or the like, implies an image corresponding to an object OBn.

As described above, in the images of FIGS. 9F and 15, an image (non-blurred image) 152a of the near-distance object group 152 made up of a normal, clear image for which blur processing is not carried out, a blurred image 154a' of the mid-distance object group for which a one-pixel portion blur processing is carried out, and a blurred image 156a" of the background BG including far-distance object group for which a two-pixel portion blur processing is carried out, are rendered.

In Step S13, at the next vertical synchronization signal Vsync, the display of screen 200 is switched, by switching of the contents rendered in the rendering area 202 with the rendered content of the rendering area 204, which is currently being displayed on the screen 200.

As discussed above, FIG. 15 is an image that is displayed on the screen 200 of the display 69 following switching of the screen display. A user (player) of the video game device who operates the controller 20 etc. can visually perceive the image 152a corresponding to the near-distance object group 152 as non-blurred, clear image, can visually perceive the image 154a' corresponding to the mid-distance object group 154 as a somewhat blurred image, and can visually perceive the image 156a" corresponding to the background image BG including far-distance object group 156 as being the most blurred image. By carrying out blur processing in this manner, it is possible to attain an effective image which resembles the characteristics of a camera. More specifically, an image (screen image 220) agreeing with a camera-like characteristic in which near objects which are in focus are seen clearly, yet further distant objects are seen as blurred, can be observed on the screen 200.

Figure 16:
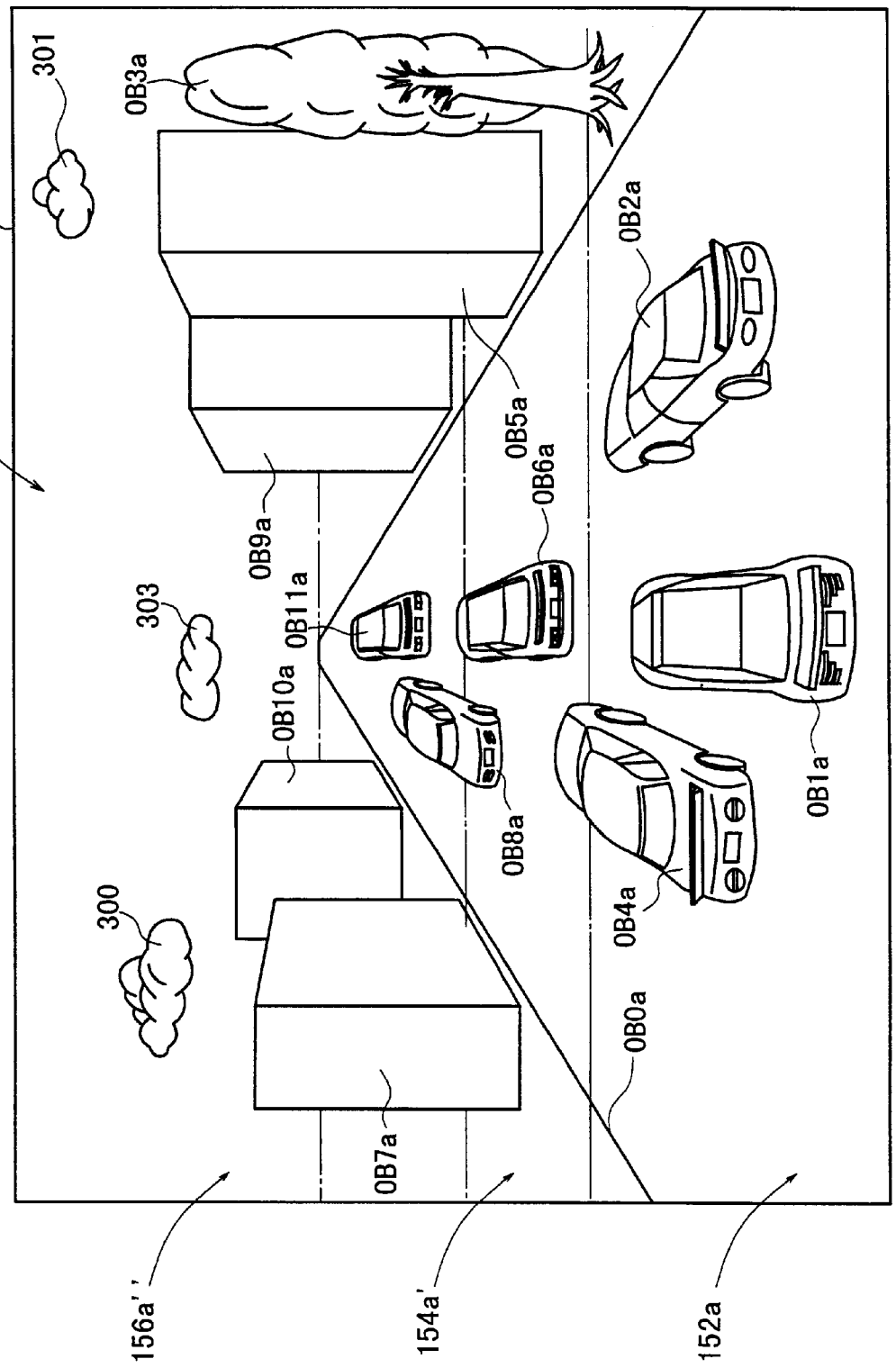
FIG. 16 is a typical view showing an example of a screen display which does not contain blurring processing, as a comparison corresponding to the screen display example of FIG. 15.

In FIG. 16, as a comparison, an image 222 of the screen 200 is shown for the case in which blur processing was not performed. By comparing this image 222 with the image 220 after blur processing shown in FIG. 15, it is understood that the blur processed image 220 shown by FIG. 15 is superior in terms of the sense of perspective that player, or the like, perceives.

Next, step 1 is returned to again, and an active camera 150 at the current point is judged, and once again in accordance with Step S2, objects within the field of view of the camera are detected, and again according to Step S3, the next screen frame is created by perspective projection conversion. Hereafter, processing from Step S5 to Step S13 is repeated.

As a result of repeating the processing in this way, blur processing according to the present embodiment is continued.

As discussed in detail above, according to the above-mentioned embodiment, corresponding to a depth amount (i.e. depth information) of an object OBn in three-dimensional space including a background image BG, and with respect to source image data expressing the aforementioned object OBn, image data obtained by making the source image data substantially semi-transparent is shifted in position, overlappingly written upon, and is rendered in the frame buffer 63. As a result, an effect is achieved in which an object having a shifted focus corresponding to the depth information thereof, a so-called blurred image, can be displayed on the screen 200 of the display 69.

In addition, in the case of plural objects OBn, excluding the nearest (in terms of visual perception, that which is closest to the player) near-distance object group 152, an amount of shifting in position is made larger in the order of objects having a largest depth amount, and is caused to be rendered in the frame buffer 63. As a result, an effect is achieved whereby objects for which the depths thereof are larger are observed to have their focus shifted (i.e. to be blurred) more.

In this case, for the focus shifting processing according to this embodiment, a complex digital filtering, as in the prior technique, is not used; therefore, calculations are simplified and the time required for processing such calculations can be shortened.

Further, in the above-mentioned embodiment, because the program pertaining to the flowcharts shown in FIG. 5 and FIG. 10 is originally stored on an optical disk 79, it may be said that the optical disk 79 is a medium storing thereon a program which comprises: a step for shifting upwardly by at least one pixel portion on the screen 200 an image corresponding to an object having a large depth amount Z, from among a plurality of three-dimensional objects, based on depth amount Z information of the plurality of three-dimensional objects; and a step for generating an image, for displaying an image in which, as necessary, the one-pixel shifted image is subjected to semi-transparency formation processing and is overlapped on the image before such one-pixel shifting takes place, together with an image having a small depth amount Z.

Moreover, in the above-described embodiment, blur processing is performed twice, however, when a television of comparatively low resolution on the degree of 525 scan lines is used as the monitor, it is confirmed that such two-pass blur processing, in terms of visual perception thereof, is appropriate. In the case of a display having a higher resolution, by carrying out the blur processing three times or more, an extremely fine focus blurring process can be carried out, enabling a further realistic image expression.

Further, in the case of shifting by three times or more, there is the case that if shifting in the same direction is continued, an unnatural image results. In this case, by following an upward shift, for example, with a leftward shift, and next a downward shift, and thereafter a rightward shift, a blurring effect is achieved in which the direction of shifting there is changed.

Still further, in the above-described embodiment, for the screen, a screen 200 on a display 69 is used, however in the present invention, there can similarly be applied a case in which the image is displayed on the screen of a theater, or the like.

Furthermore, in the above-discussed embodiment, the image of near-distance object group 152 is made to be in clear focus, however, it is also possible that, for example, the image of the mid-distance object group 154 can be in focus, whereas the image of the far-distance object group 156 and image of the near-distance object group 152 are made to have a shifted focus.

As described above, according to the present invention, a currently rendered image is taken as a transmission source, and an image at a position shifted by at least one pixel therefrom is rendered substantially semi-transparently. As a result, it is possible to easily generate an image in which the focus thereof is visually perceptively shifted.

Further, by matching together with the element of distance on the screen, for example by repeating the blur processing multiple times depending on the distance, for far objects, multiple portion pixels which are subjected to repeat processing are shifted and rendered, and therefore far objects can be displayed as still further focus blurred images.

In this manner, unlike prior techniques, an extremely excellent characteristic effect (specifically, an effect in accordance with an optical characteristic in which, for example, in the case of a camera focus which is set on near objects, the near objects are seen sharply, whereas things which are farther away are seen as blurred) can be attained for a three-dimensional screen image (containing three-dimensional images therein).

Moreover, the present invention is not limited to the above-described embodiment, but naturally various structures therefor can be adopted without deviating from the essence of the present invention.

What is claimed is:

1. A recording medium storing a program thereon, comprising:

a step of shifting by at least one pixel portion, based on depth amount information of a plurality of three-dimensional objects, an image on a screen corresponding to an object having a large depth amount from among said plurality of three-dimensional objects; and a step of generating an image for displaying simultaneously in one frame image on the screen an image in which the one-pixel portion shifted image is simultaneously overlaid onto the image prior to being shifted by one pixel portion, together with an image corresponding to an object having a small depth amount.

2. The recording medium according to claim 1, wherein a direction of shifting the at least one pixel portion on said screen is either of an upward direction or a downward direction on said screen.

3. The recording medium according to claim 1, wherein said step of generating an image for displaying on the screen an image in which said one-pixel portion shifted image on the screen is overlaid onto the image prior to being shifted by one pixel portion, together with an image corresponding to an object having a small depth amount, comprises:

a step of generating an image for displaying on the screen an image in which said one-pixel portion shifted image on the screen is subjected to semi-transparency formation processing and overlaid onto the image prior to being shifted by one pixel portion, together with an image corresponding to an object having a small depth amount.

4. The image processing apparatus according to claim 1, wherein at least one of said three-dimensional objects comprises a fixed and/or moving object as viewed from a viewpoint generated by an image corresponding to said object.

5. A recording medium storing a program thereon, comprising:

a step of generating a two-dimensional background image for use on a screen display;

a step of shifting by at least one pixel portion, based on depth amount information of a plurality of three-dimensional objects, an image on a screen corresponding to an object having a large depth amount from among said plurality of three-dimensional objects, along with said background image and on said background image; and a step of generating an image for displaying simultaneously in one frame image on the screen an image in which said one-pixel portion shifted image on the screen is simultaneously overlaid on the image prior to being shifted by one pixel portion, together with an image corresponding to an object having a small depth amount.

6. The recording medium according to claim 5, wherein a direction of shifting the at least one pixel portion on said screen is either of an upward direction or a downward direction on said screen.

7. The recording medium according to claim 5, wherein said step of generating an image for displaying on the screen an image in which said one-pixel portion shifted image on the screen is overlaid onto the image prior to being shifted by one pixel portion, together with an image corresponding to an object having a small depth amount, comprises:

a step of generating an image for displaying on the screen an image in which said one-pixel portion shifted image on the screen is subjected to semi-transparency formation processing and overlaid onto the image prior to being shifted by one pixel portion, together with an image corresponding to an object having a small depth amount.

8. The image processing apparatus according to claim 5, wherein at least one of said three-dimensional objects comprises a fixed and/or moving object as viewed from a viewpoint generated by an image corresponding to said object.

9. An image processing apparatus, comprising:

recording means on which a plurality of three-dimensional objects together with depth information are recorded;

a frame buffer having a rendering area in which said plurality of three-dimensional objects are converted to images according to a predetermined process and rendered;

display means for displaying on a screen the images which are rendered in said rendering area of said frame buffer; and rendering control means for performing a conversion processing from said three-dimensional objects to said images, wherein said rendering control means shifts by at least one pixel portion and renders on said frame buffer, based on depth amount information of said plurality of three-dimensional objects, an image corresponding to an object having a large depth amount from among said plurality of three-dimensional objects, generates and renders an image (referred to as a blurred image) in which said one-pixel portion shifted and rendered image is subjected to semi-transparency formation processing and simultaneously overlaid onto the image prior to being one-pixel shifted, renders in said rendering area said blurred image together with an image having a small depth amount from images corresponding to said plurality of three-dimensional objects, and displays simultaneously in one frame image on said display means said blurred image and said image having a small depth amount.

10. The image processing apparatus according to claim 9, wherein said rendering region is set as two areas in said frame buffer, and wherein said rendering control means effects a control so that, when the image which is rendered in one of said rendering areas is being displayed on a screen of the display means, rendering of the image which includes the blurred image is carried out in the other rendering area, and after completion of rendering of the image which contains the blurred image, the image which is rendered in said other rendering area is displayed on said display means.

11. The image processing apparatus according to claim 9, wherein a direction of shifting the at least one pixel portion on said screen is either of an upward direction or a downward direction on said screen.

12. The image processing apparatus according to claim 9, wherein at least one of said three-dimensional objects comprises a fixed and/or moving object as viewed from a viewpoint generated by an image corresponding to said object.

13. An image processing apparatus, comprising:

recording means on which information of a two-dimensional background image for display on a screen, and a plurality of three-dimensional objects together with depth information are recorded;

a frame buffer having a rendering area in which said two-dimensional background image is rendered, and wherein said plurality of three-dimensional objects are converted to images and rendered on said background image;

display means for displaying on a screen the images which are rendered in said rendering area of said frame buffer; and rendering control means for performing a conversion processing from said three-dimensional objects to said images, wherein said rendering control means shifts by at least one pixel portion and renders on said frame buffer, based on depth amount information of said plurality of three-dimensional objects, an image corresponding to an object having a large depth amount from among said plurality of three-dimensional objects together with said background image, generates and renders an image (referred to as a blurred image) in which said one-pixel portion shifted and rendered image is subjected to semi-transparency formation processing and simultaneously overlaid onto the image prior to being shifted by one pixel portion, renders in said rendering area said blurred image together with an image having a small depth amount from images corresponding to said plurality of three-dimensional objects, and displays simultaneously in one frame image on said display means said blurred image and said image having a small depth amount.

14. The image processing apparatus according to claim 13, wherein said rendering region is set as two areas in said frame buffer, and wherein said rendering control means effects a control so that, when the image which is rendered in one of said rendering areas is being displayed on a screen of the display means, rendering of the image which includes the blurred image is carried out in the other rendering area, and after completion of rendering of the image which contains the blurred image, the image which is rendered in said other rendering area is displayed on said display means.

15. The image processing apparatus according to claim 13, wherein a direction of shifting the at least one pixel portion on said screen is either of an upward direction or a downward direction on said screen.

16. The image processing apparatus according to claim 13, wherein at least one of said three-dimensional objects comprises a fixed and/or moving object as viewed from a viewpoint generated by an image corresponding to said object.

17. An image processing method, comprising:
a step of preparing source image data in which each pixel value therein is expressed as RGB value;
a step of creating one-pixel shifted image data in which said source image data is shifted by at least one pixel in a predetermined direction;
a step of creating blurred image data formed as a result of overlaying said one-pixel shifted image data on said source image data, and RGB values to which the RGB value of pixels corresponding in position are added respectively at a predetermined ratio; and
displaying said blurred image data simultaneously in one frame image on a display means.

18. The image processing method according to claim 17, wherein said predetermined direction is one of an upward, downward, rightward or leftward direction, and said predetermined ratio is 50%:50%.

19. An image processing apparatus, comprising:
recording means on which a plurality of three-dimensional objects together with depth information are recorded;
a frame buffer having a rendering area in which said plurality of three-dimensional objects are rendered after being subjected to perspective projection conversion from a predetermined viewpoint and converted into images;
display means for displaying on a screen a plurality of images which are rendered in said rendering area; and
rendering control means for performing processing of said perspective projection conversion;
wherein said rendering control means:
classifies, based on said fixed viewpoint, images corresponding to said plurality of three-dimensional objects in said rendering area of said frame buffer, into a far-distance image group, a mid-distance image group and a near-distance image group, pertaining to said depth information, and renders said far-distance object group in said rendering area;
renders, in said rendering area, an image (referred to as a blurred far-distance image group) for which a far-distance image group, in which the far-distance object group has been shifted by at least one pixel in a first predetermined direction, is subjected to semi-transparency formation processing and overlaid on said far-distance image group before being shifted;
further renders in said rendering area said mid-distance image group;
further shifts, with respect to the rendering area in which said mid-distance image group and said blurred far-distance image group are rendered, said mid-distance image group and said blurred far-distance image group by at least one pixel in a second predetermined direction, and renders in said rendering area an image (an image resulting from a double blurred far-distance image group and a blurred mid-distance image group) which is subjected to semi-transparency formation processing and overlaid on the image group before being shifted; and
further renders, in the rendering area, said near-distance image group.

20. The image processing apparatus according to claim 19, wherein said first predetermined direction and said second predetermined direction are of a same direction or of a different direction.

21. The image processing apparatus according to claim 19, wherein a direction of shifting of the at least one-pixel portion on said screen is either of an upward direction or a downward direction on said screen.

22. The image processing apparatus according to claim 19, wherein said three-dimensional object comprises a fixed and/or moving object as viewed from a viewpoint generated by an image corresponding to said object.

23. An image processing apparatus, comprising:
recording means on which a plurality three-dimensional objects together with depth information are recorded, and in which a two-dimensional background image for a display screen are recorded;
a frame buffer having a rendering area in which said background image is rendered, and in which a plurality of three-dimensional objects are rendered after being subjected to perspective projection conversion from a predetermined viewpoint and converted into images;
display means for displaying on a screen a plurality of images which are rendered in said rendering area; and
rendering control means for performing processing of said perspective projection conversion;
wherein said rendering control means:
classifies, based on said fixed viewpoint, images corresponding to said plurality of three-dimensional objects in said rendering area of said frame buffer, into a far-distance image group, a mid-distance image group and a near-distance image group, pertaining to said depth information, and renders said far-distance object group in said rendering area, after said two-dimensional background image is rendered;
renders, in said rendering area, an image (referred to as a blurred far-distance image group) for which a background image attached far-distance image group, in which the far-distance object group together with the background image have been shifted by at least one pixel in a first predetermined direction, is subjected to semi-transparency formation processing and overlaid on the background image attached far-distance image group before being shifted;

further renders in said rendering area said mid-distance image group;

further shifts, with respect to the rendering area in which said mid-distance image group and said blurred far-distance image group are rendered, said mid-distance image group and said blurred far-distance image group by at least one pixel in a second predetermined direction, and renders in said rendering area an image (an image resulting from a double blurred far-distance image group and a blurred mid-distance image group) which is subjected to semi-transparency formation processing and overlaid on the image group before being shifted; and further renders, in the rendering area, said near-distance image group.

24. The image processing apparatus according to claim 23, wherein said first predetermined direction and said second predetermined direction are of a same direction or of a different direction.

25. The image processing apparatus according to claim 23, wherein a direction of shifting of the at least one-pixel portion on said screen is either of an upward direction or a downward direction on said screen.

26. The image processing apparatus according to claim 23, wherein said three-dimensional object comprises a fixed and/or moving object as viewed from a viewpoint generated by an image corresponding to said object.

27. A recording medium storing a program thereon, comprising:

a step of shifting by at least one pixel portion, based on depth amount information of a plurality of three-dimensional objects, an image on a screen corresponding to an object having a large depth amount from among said plurality of three-dimensional objects; and a step of generating an image for displaying on the screen an image in which the one-pixel portion shifted image is overlaid onto the image prior to be shifted by one pixel portion, together with an image corresponding to an object having a small depth amount, wherein a direction of shifting the at least one pixel portion on said screen is either of an upward direction or a downward direction on said screen.

28. The recording medium according to claim 27, wherein said step of generating an image for displaying on the screen an image in which said one-pixel portion shifted image on the screen is overlaid onto the image prior to being shifted by one pixel portion, together with an image corresponding to an object having a small depth amount, comprises:

a step of generating an image for displaying on the screen an image in which said one-pixel portion shifted image on the screen is subjected to semi-transparency formation processing and overlaid onto the image prior to being shifted by one pixel portion, together with an image corresponding to an object having a small depth amount.

29. The recording medium according to claim 27, wherein at least one of said three-dimensional objects comprises a fixed and/or moving object as viewed from a viewpoint generated by an image corresponding to said object.

30. A recording medium storing a program thereon, comprising:

a step of generating a two-dimensional background image for use on a screen display;

a step of shifting by at least one pixel portion, based on depth amount information of a plurality of three-dimensional objects, an image on a screen corresponding to an object having a large depth amount from among said plurality of three-dimensional objects, along with said background image and on said background image; and a step of generating an image for displaying on the screen an image in which said one-pixel portion shifted image on the screen is overlaid on the image prior to being shifted by one pixel portion, together with an image corresponding to an object having a small depth amount, wherein a direction of shifting the at least one pixel portion on said screen is either of an upward direction or a downward direction on said screen.

31. The recording medium according to claim 30, wherein said step of generating an image for displaying on the screen an image in which said one-pixel portion shifted image on the screen is overlaid onto the image prior to being shifted by one pixel portion, together with an image corresponding to an object having a small depth amount, comprises:

a step of generating an image for displaying on the screen an image in which said one-pixel portion shifted image on the screen is subjected to semi-transparency formation processing and overlaid onto the image prior to being shifted by one pixel portion, together with an image corresponding to an object having a small depth amount.

32. The recording medium according to claim 30, wherein at least one of said three-dimensional objects comprises a fixed and/or moving object as viewed from a viewpoint generated by an image corresponding to said object.

33. An image processing apparatus, comprising:

recording means on which a plurality of three-dimensional objects together with depth information are recorded;

a frame buffer having a rendering area in which said plurality of three-dimensional objects are converted to images according to a predetermined process and rendered;

display means for displaying on a screen the images which are rendered in said rendering area of said frame buffer; and rendering control means for performing a conversion processing from said three-dimensional objects to said images, wherein said rendering control means shifts by at least one pixel portion and renders on said frame buffer, based on depth amount information of said plurality of three-dimensional objects, an image corresponding to an object having a large depth amount from among said plurality of three-dimensional objects, generates and renders an image (referred to as a blurred image) in which said one-pixel portion shifted and rendered image is subjected to semi-transparency formation processing and overlaid onto the image prior to being one-pixel shifted, renders in said rendering area said blurred image together with an image having a small depth amount from images corresponding to said plurality of three-dimensional objects, and displays on said display means said blurred image and said image having a small depth amount, and wherein a direction of shifting the at least one pixel portion on said screen is either of an upward direction or a downward direction on said screen.

34. The image processing apparatus according to claim 33, wherein said rendering region is set as two areas in said frame buffer, and wherein said rendering control means effects a control so that, when the image which is rendered in one of said rendering areas is being displayed on a screen of the display means, rendering of the image which includes the blurred image is carried out in the other rendering area, and after completion of rendering of the image which contains the blurred image, the image which is rendered in said other rendering area is displayed on said display means.

35. The image processing apparatus according to claim 33, wherein at least one of said three-dimensional objects comprises a fixed and/or moving object as viewed from a viewpoint generated by an image corresponding to said object.

36. An image processing apparatus, comprising:
- recording means on which information of a two-dimensional background image for display on a screen, and a plurality of three-dimensional objects together with depth information are recorded;
- a frame buffer having a rendering area in which said two-dimensional background image is rendered, and wherein said plurality of three-dimensional objects are converted to images and rendered on said background image;
- display means for displaying on a screen the images which are rendered in said rendering area of said frame buffer; and
- rendering control means for performing a conversion processing from said three-dimensional objects to said images,
- wherein said rendering control means shifts by at least one pixel portion and renders on said frame buffer, based on depth amount information of said plurality of three-dimensional objects, an image corresponding to an object having a large depth amount from among said plurality of three-dimensional objects together with said background image, generates and renders an image (referred to as a blurred image) in which said one-pixel portion shifted and rendered image is subjected to semi-transparency formation processing and overlaid onto the image prior to being shifted by one pixel portion, renders in said rendering area said blurred image together with an image having a small depth amount from images corresponding to said plurality of three-dimensional objects, and displays on said display means said blurred image and said image having a small depth amount, and
- wherein a direction of shifting the at least one pixel portion on said screen is either of an upward direction or a downward direction on said screen.

37. The image processing apparatus according to claim 36, wherein said rendering region is set as two areas in said frame buffer, and wherein said rendering control means effects a control so that, when the image which is rendered in one of said rendering areas is being displayed on a screen of the display means, rendering of the image which includes the blurred image is carried out in the other rendering area, and after completion of rendering of the image which contains the blurred image, the image which is rendered in said other rendering area is displayed on said display means.

38. The image processing apparatus according to claim 34, wherein at least one of said three-dimensional objects comprises a fixed and/or moving object as viewed from a viewpoint generated by an image corresponding to said object.

39. An image processing method, comprising:
- a step of preparing source image data in which each pixel value therein is expressed as RGB value;
- a step of creating one-pixel shifted image data in which said source image data is shifted by at least one pixel in a predetermined direction; and
- a step of creating blurred image data formed as a result of overlaying said one-pixel shifted image data on said source image data, and RGB values to which the RGB value of pixels corresponding in position are added respectively at a predetermined ratio, wherein said predetermined direction is one of an upward, downward, rightward or leftward direction, and said predetermined ratio is 50%:50%.

* * * * *